US012576729B2

(12) United States Patent
Kunimitsu et al.

(10) Patent No.: US 12,576,729 B2
(45) **Date of Patent: \*Mar. 17, 2026**

(54) BATTERY MODULE, POWER SUPPLY DEVICE COMPRISING BATTERY MODULE, AND ELECTRIC VEHICLE AND POWER STORAGE DEVICE COMPRISING POWER SUPPLY DEVICE

(71) Applicant: SANYO Electric Co., Ltd., Osaka (JP)

(72) Inventors: Tomonori Kunimitsu, Hyogo (JP); Masato Nakayama, Hyogo (JP); Junya Yano, Hyogo (JP); Taisuke Hamada, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 893 days.

This patent is subject to a terminal disclaimer.

(21) Appl. No.: 17/758,966

(22) PCT Filed: Sep. 15, 2020

(86) PCT No.: PCT/JP2020/034803
§ 371 (c)(1),
(2) Date: Jan. 6, 2023

(87) PCT Pub. No.: WO2021/149300
PCT Pub. Date: Jul. 29, 2021

(65) Prior Publication Data
US 2023/0226929 A1      Jul. 20, 2023

(30) Foreign Application Priority Data
Jan. 23, 2020    (JP) ................................. 2020-009519

(51) Int. Cl.
*H01M 50/209* (2021.01)
*B60L 50/64* (2019.01)
(Continued)

(52) U.S. Cl.
CPC ............... *B60L 50/64* (2019.02); *B60L 53/14* (2019.02); *B60L 53/66* (2019.02); *H01M 10/46* (2013.01);
(Continued)

(58) Field of Classification Search
CPC .......... B60L 50/64; B60L 53/14; B60L 53/66; H01M 10/425; H01M 10/4257;
(Continued)

(56) References Cited

U.S. PATENT DOCUMENTS 9,444,086 B2    9/2016  Shimizu et al.
2011/0206948 A1    8/2011  Asai et al.
(Continued)

FOREIGN PATENT DOCUMENTS

CN         102163702 A     8/2011
JP         2011-175743     9/2011
(Continued)

OTHER PUBLICATIONS

Extended (Supplementary) European Search Report dated Sep. 20, 2023, issued in counterpart EP application No. 20916065.4. (8 pages).
(Continued)

*Primary Examiner* — Victoria H Lynch
(74) *Attorney, Agent, or Firm* — WHDA, LLP

(57) ABSTRACT
A battery module includes battery stack including a plurality of stacked battery cells, a pair of end plates disposed at both end parts in a stacking direction of battery stack, bind bar in which the pair of end plates are coupled, and electronic circuit block mounted with voltage detection circuit that detects a voltage of battery cells. Electronic circuit block is disposed on an outer surface of both end plates disposed at both end parts of battery stack, and electronic circuit block is connected to battery cells via voltage detection line.

13 Claims, 14 Drawing Sheets

(51) Int. Cl.

| | |
|---|---|
| *B60L 53/14* | (2019.01) |
| *B60L 53/66* | (2019.01) |
| *H01M 10/46* | (2006.01) |
| *H01M 10/48* | (2006.01) |
| *H01M 50/342* | (2021.01) |
| *H01M 50/367* | (2021.01) |
| *H02J 7/00* | (2006.01) |

(52) U.S. Cl.
CPC ....... *H01M 10/482* (2013.01); *H01M 50/209* (2021.01); *H01M 50/3425* (2021.01); *H01M 50/367* (2021.01); *H02J 7/0014* (2013.01); *H02J 7/0063* (2013.01); *H02J 7/007* (2013.01); *H01M 2220/20* (2013.01); *H02J 2310/48* (2020.01)

(58) Field of Classification Search
CPC ............... H01M 10/46; H01M 10/482; H01M 2220/20; H01M 50/209; H01M 50/249; H01M 50/284; H01M 50/298; H01M 50/3425; H01M 50/35; H01M 50/367; H01M 50/569; H02J 2310/48; H02J 3/322; H02J 7/0014; H02J 7/0016; H02J 7/0063; H02J 7/007; H02J 9/06; Y02E 60/10; Y02T 10/7072; Y02T 90/12
See application file for complete search history.

(56) References Cited

U.S. PATENT DOCUMENTS

| | | | |
|---|---|---|---|
| 2012/0161677 A1 | 6/2012 | Kunimitsu et al. | |
| 2013/0049457 A1 | 2/2013 | Komatsu et al. | |
| 2013/0183543 A1 | 7/2013 | Yoshioka et al. | |
| 2015/0137824 A1 | 5/2015 | Nishihara | |
| 2017/0264111 A1 | 9/2017 | Komatsu et al. | |
| 2019/0199117 A1* | 6/2019 | Yang ................... | H02J 7/0013 |

FOREIGN PATENT DOCUMENTS

| | | |
|---|---|---|
| JP | 2013-051856 | 3/2013 |
| JP | 2013-168357 | 8/2013 |
| WO | 2014/024452 | 2/2014 |

OTHER PUBLICATIONS

International Search Report of PCT application No. PCT/JP2020/034803 dated Nov. 17, 2020.
English translation of Search Report dated Dec. 7, 2023, issued in counterpart CN Application No. 202080092689.9. (4 pages).

* cited by examiner

BATTERY MODULE, POWER SUPPLY DEVICE COMPRISING BATTERY MODULE, AND ELECTRIC VEHICLE AND POWER STORAGE DEVICE COMPRISING POWER SUPPLY DEVICE

TECHNICAL FIELD

The present invention relates to a battery module in which a plurality of battery cells are connected, a power supply device including a plurality of the battery modules, and an electric vehicle and a power storage device that include this power supply device. In particular, the present invention relates to a battery module and a power supply device that are mounted on an electric vehicle such as a hybrid vehicle, an electric automobile, a fuel cell vehicle, and an electric motorcycle and supply electric power to a motor which causes the vehicle to travel, or a large-current battery module and power supply device used for home and factory power storage applications, and an electric vehicle and a power storage device that include this power supply device.

In the present description, the term "battery module" is used in a broad sense including all battery modules in which a pair of end plates are disposed on both end surfaces of a plurality of battery cells and the end plates are coupled with a bind bar, and including a voltage detection circuit that detects a voltage of a battery cell. Examples of the battery module include a "battery pack" that does not incorporate a controlling circuit such as a charge and discharge controlling circuit which controls charge and discharge electric current.

BACKGROUND ART

A battery module including a plurality of battery cells is used for a power source for a vehicle such as a hybrid automobile or an electric automobile, a power source of a power storage system for a factory, a home, and the like (e.g., refer to PTL 1).

An example of such a battery module is shown in an exploded perspective view of FIG. 15. In battery module 900 shown in this figure, a plurality of battery cells 901 are stacked to make battery stack 902, end plates 903 are disposed on both end surfaces of this battery stack 902, and the pair of end plates 903 are fastened by bind bars 904 to fix battery cells 901. In each battery cell 901, a pair of positive and negative electrode terminals 911 are disposed on an upper surface of terminal surface 910. Positive and negative electrode terminals 911 are electrically connected via bus bar 914 to connect battery cells 901 in series or in parallel.

Circuit board 906 connected to each battery cell 901 is disposed on an upper surface of battery stack 902. A voltage detection circuit that detects information such as a voltage of battery cells 901 is mounted on circuit board 906 so that battery cells 901 can be charged and discharged while being protected.

CITATION LIST

Patent Literature

PTL 1: International Patent Publication No. 2014/024452

SUMMARY OF THE INVENTION

Technical Problem

The battery module described above becomes an obstacle for heightening the circuit board as a whole. In addition, a gas duct is also disposed on an upper surface of the battery stack, and since high temperature and high pressure ejected from exhaust valves of the battery cells flows into this gas duct, high-temperature, high-pressure exhaust gas leaking from the gas duct causes a failure of the circuit board.

The present invention has been developed for the purpose of preventing the above adverse effects, and an object of the present invention is to provide a technique for achieving high safety by preventing damage to a circuit board due to high-temperature, high-pressure exhaust gas ejected from battery cells while lowering the height of a battery module.

Solution to Problem

A battery module according to an aspect of the present invention includes a battery stack including a plurality of stacked battery cells, a pair of end plates disposed at both end parts in a stacking direction of the battery stack, a bind bar in which the pair of end plates are coupled, and an electronic circuit block mounted with a voltage detection circuit that detects a voltage of the plurality of stacked battery cells. The electronic circuit block is disposed on an outer surface of both of the pair of end plates disposed at both end parts of the battery stack, and the electronic circuit block is connected to the plurality of stacked battery cells via a voltage detection line.

A power supply device according to an aspect of the present invention includes a plurality of the above battery modules and a power line and an external communication line which connect adjacent battery modules. The power line is connected to output terminals of the adjacent battery modules. The external communication line is connected to a communication terminal. The external communication line is connected to communication terminals located at ends of the adjacent battery modules where the power line is connected. Both the power line and the external communication line are connected to ends on the same side of the adjacent battery modules.

An electric vehicle according to an aspect of the present invention includes the above power supply device, a motor for travelling supplied with electric power from the power supply device, a vehicle body equipped with the power supply device and the motor, and a wheel that is driven by the motor to cause the vehicle body to travel.

A power storage device according to an aspect of the present invention includes the above power supply device, and a power supply controller that controls charging and discharging of the power supply device. The power supply controller enables charging of the plurality of stacked battery cells with electric power from outside and controls the charging of the plurality of stacked battery cells.

Advantageous Effect of Invention

The battery module described above protects the electronic circuit block including the voltage detection circuit from high-temperature, high-pressure exhaust gas to achieve high safety while reducing height, and can efficiently dissipate heat from the electronic circuit block.

BRIEF DESCRIPTION OF THE DRAWINGS

FIG. 10 is a broad plan view of a power supply device including a plurality of battery modules.

FIG. 11 is a broad circuit diagram of the power supply device shown in FIG. 10.

DESCRIPTION OF EMBODIMENTS

Figure 1:
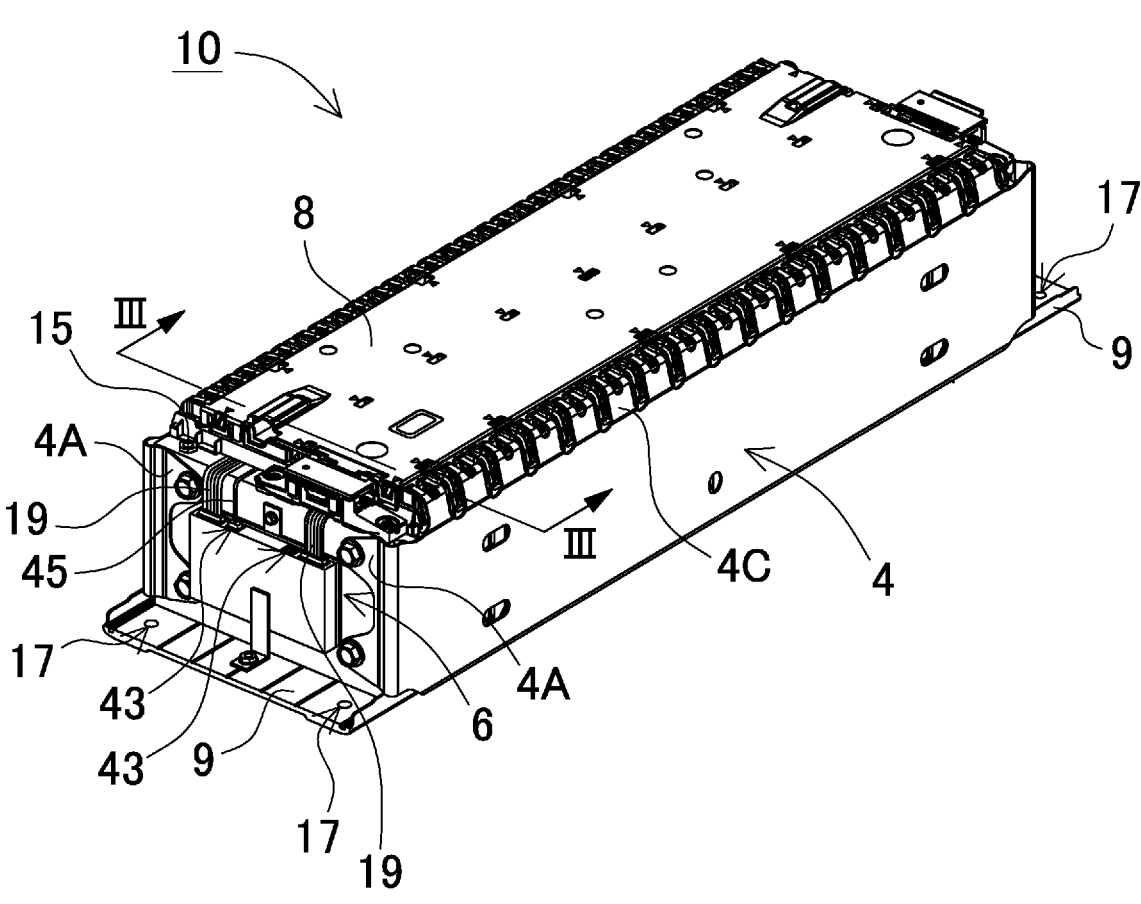
FIG. 1 is a perspective view of a battery module according to a first exemplary embodiment of the present invention.

First, a subject that the inventors of the present invention focus on will be described. In a common power supply module, a gas duct is disposed on an upper surface of a battery stack in order to eject an exhaust gas ejected from an exhaust valve of a battery cell to the outside. The gas duct is provided to exhaust high-temperature, high-pressure exhaust gas ejected from the exhaust valve of the battery cell to the outside. When the internal pressure rises to a set value, the exhaust valve of the battery cell opens to prevent burst of the battery case. This exhaust valve opens upon detection that the internal pressure of the battery has become abnormally high. The internal pressure of the battery cell becomes abnormally high due to occurrence of events such as overcharge, overdischarge, and internal short circuit, which cause occurrence of a combustion event inside the battery cell. Therefore, the exhaust gas becomes high temperature and high pressure. Since the high-temperature, high-pressure exhaust gas ejected from the battery cell has an adverse effect such as combustion of peripheral members, the exhaust gas is ejected to the outside by the gas duct. The gas duct is disposed on the battery stack to guide the exhaust gas from the exhaust valve of the battery cell to the outside. The gas duct is provided with an inflow hole through which the exhaust gas ejected from an exhaust valve of each battery cell flows in.

The power supply module further includes a circuit board on which a voltage detection circuit that detects a voltage of each battery cell is mounted to prevent overcharge and overdischarge of the battery cell. The voltage detection circuit provided on the circuit board is connected to an electrode terminal of each battery cell via a voltage detection line to detect the voltage of the battery cell. The voltage detection line can be shortened by disposing the circuit board on the upper surface of the battery stack. The impedance of a short voltage detection line is small, which enables accurate detection of the cell voltage.

As described above, in the power supply module including the gas duct and the circuit board, the gas duct is disposed on an electrode surface of the battery stack and coupled to the exhaust valve of the battery cell, the circuit board is disposed on the gas duct, and the voltage detection circuit of the circuit board can be connected to the battery cell via the voltage detection line.

Here, in the power supply module, a gas duct extending in a stacking direction of the battery cell is disposed on the upper surface of the battery stack, and the exhaust gas ejected from the battery cell can be smoothly ejected to the outside. Further, a circuit board extending in the stacking direction of the battery cell is disposed on the gas duct, and the voltage detection circuit of the circuit board can be connected to an electrode terminal of the battery cell by a short voltage detection line. However, in the power supply module having this structure, the high-temperature, high-pressure exhaust gas ejected from the battery cell has an adverse effect such as combustion of the circuit board. In particular, the electronic components of the voltage detection circuit of the circuit board are adversely affected by the high-temperature, high-pressure exhaust gas, and the safety is reduced. Furthermore, a connector and a lead wire of the voltage detection line are also disposed on the upper surface of the battery stack. The high-temperature, high-pressure exhaust gas burns the connector and the lead wire, and such combustion heat causes the battery cell to emit smoke and ignite in a chain manner, thereby causing a reduction in safety.

Since the exhaust gas has an abnormally high temperature and high pressure, it is difficult for the gas duct to completely eject the gas to the outside. Although the circuit board is separated from the terminal surface of the battery cell by the gas duct, the exhaust gas leaking from the gas duct may further increase heat damage, such as combustion of the circuit board. The exhaust gas contains foreign matters such as metal pieces inside the battery cell, and this also causes events such as short-circuit failure of an electronic circuit of the circuit board.

It is desired that the entire battery module is downsized with almost no exception in all applications. This is because the capacity of charge and discharge with respect to the unit volume is increased to improve the performance. However, since a large number of components are disposed on the upper surface of the battery stack, it is difficult to reduce the height as a whole. Specifically, examples of the components disposed on the upper surface of the battery stack include a gas duct for discharging exhaust gas, an electrode terminal protruding from the terminal surface, a bus bar of a metal sheet for connecting adjacent electrode terminals, a circuit board on which an electronic component is mounted, a lead wire for connecting the circuit board and a battery cell, and an insulation material for insulating the components from a high-voltage battery stack. Many of these components need to be disposed so as not to interfere with one another.

In a battery module in which a large number of components such as a gas duct, a circuit board, and a lead wire are disposed on the upper surface of the battery stack, it is difficult to reduce the height of the battery module to downsize the battery module only by improving the component disposition, and the circuit board substantially has an adverse effect in increasing the volume, in particular the height, of the battery module. On the other hand, when the circuit board is thinned and downsized, a disadvantage that the heat energy of a heat generating component mounted on the circuit board cannot be efficiently dissipated becomes remarkable. Since a heat generating component such as a semiconductor element or a discharge resistor is mounted on the circuit board, it is extremely important to efficiently dissipate heat energy to lower a temperature rise of the heat generating component below a set temperature. A power supply module described in the following exemplary embodiments can solve the above disadvantages through a unique structure.

Hereinafter, the present invention will be described in detail with reference to the drawings. Note that, in the following description, terms (e.g., "top", "bottom", and other terms including those terms) indicating specific directions or positions are used as necessary; however, the use of those terms is for facilitating the understanding of the invention with reference to the drawings, and the technical scope of the present invention is not limited by the meanings of the terms. Parts denoted by the same reference numerals appearing in a plurality of drawings indicate the same or equivalent parts or members.

Exemplary embodiments described below show a specific example of the technical idea of the present invention, and the present invention is not limited to the exemplary embodiments below. In addition, unless otherwise specified, dimensions, materials, shapes, relative dispositions, and the like of the configuration components described below are not intended to limit the scope of the present invention only to them, but are intended to be illustrative. The contents described in one exemplary embodiment or example are also applicable to other exemplary embodiments and examples. The sizes, positional relationships, and the like of members shown in the drawings may be exaggerated in order to clarify description.

A battery module of a first exemplary embodiment of the present invention includes a battery stack including a plurality of stacked battery cells, a pair of end plates disposed at both end parts in a stacking direction of the battery stack, a bind bar in which the pair of end plates are coupled, and an electronic circuit block mounted with a voltage detection circuit that detects a voltage of the battery cells. The electronic circuit block is disposed on an outer surface of both end plates disposed at both end parts of the battery stack, and the electronic circuit block is connected to the battery cells via a voltage detection line.

The above battery module has an advantage that the battery module can be downsized to increase the charge and discharge capacity with respect to the unit volume while protecting the circuit board from the high-temperature, high-pressure exhaust gas ejected from the exhaust valve of the battery cells, and the heat energy of the electronic circuit block on which the voltage detection circuit is mounted can be efficiently dissipated to the end plate and the outside and the temperature rise of the electronic circuit block can be reduced. In particular, the above structure allows the electronic circuit block to be disposed vertically on the surface of the end plate, so that the above structure has an advantage of being able to efficiently dissipate heat by the air smoothly convecting on the surface of the electronic circuit block. The electronic circuit block shielded from the high-temperature, high-pressure exhaust gas by the end plate ensures high safety as a normal operation state even in an abnormal use state of the battery cells in which the exhaust valve opens. The characteristic that the heat energy of the electronic circuit block can be efficiently dissipated also achieves an advantage that temperature rise can be reduced while the electronic circuit block is downsized. A temperature rise of the electronic component mounted on the electronic circuit block is also reduced, and a feature that a stable operation of the electronic component can be guaranteed is also achieved.

In the above battery module, since the electronic circuit block is disposed on both end plates disposed at both ends of the battery stack, that is, the electronic circuit block is divided into two electronic circuit blocks and disposed on the end plates, the voltage detection line connecting the battery cells and the electronic circuit block can be shortened. This is because each battery cell can be connected with the voltage detection line to the electronic circuit block disposed nearby, Being able to shorten the voltage detection line is extremely important for detecting the voltage of the battery cells with higher accuracy. This is because a long voltage detection line has a high impedance and is easily affected by noise. Furthermore, a long voltage detection line has a large voltage drop, and the noise and the voltage drop cause a detection error of the cell voltage. Since the detection accuracy of the cell voltage affects the degradation and life of the battery module, the level of accuracy by which the cell voltage can be detected is extremely important.

In the above battery module, since the electronic circuit block is disposed on the outer surface of the end plates and not disposed on the electrode surface of the battery stack, the electronic circuit block can be protected from the high-temperature, high-pressure exhaust gas ejected from the battery cells while designing the entire battery module to be low. Further, since the end plates are disposed between the battery stack and the electronic circuit block, the end plates can shield the electronic circuit block from the exhaust gas of the battery cells to protect the electronic circuit block from the high-temperature, high-pressure exhaust gas. Therefore, the normal operation of the electronic circuit block is guaranteed even in an abnormal state, and high safety is guaranteed. In addition, since two electronic circuit blocks are respectively disposed on the end plates at both ends of the battery stack, the voltage detection line connecting the battery cells and the electronic circuit block is shortened to reduce the line impedance, particularly electrical resistance, and achieve an advantage of enabling detection of the voltage of each battery cell with high accuracy. In addition, since heat generated by the electronic circuit block can be efficiently dissipated to the end plates, a temperature rise of the electronic circuit block can be reduced. Furthermore, the electronic circuit block can be disposed vertically on the surface of the end plates, so that cooling efficiency can be increased by the air smoothly convecting on the surface of the electronic circuit block. Even in a circuit configuration in which the electronic circuit block is downsized and heat is concentrated in a narrow region, the structure capable of efficiently dissipating heat from the electronic circuit block can guarantee a more stable operation by reducing a local temperature rise and also reducing a temperature rise of a heat-generating electronic component of the electronic circuit block.

In a battery module according to a second exemplary embodiment of the present invention, a battery stack including a plurality of battery cells is partitioned into a plurality of battery units in the middle in a stacking direction of the battery cells, and each battery unit is separately connected to an electronic circuit block via a voltage detection line.

In a battery module according to a third exemplary embodiment of the present invention, a battery stack includes a gas duct connected to opening parts of exhaust valves provided in battery cells, the gas duct is disposed at a center of an electrode surface of the battery stack extending in a stacking direction of the battery cells, and a voltage detection line is disposed along a side edge of the gas duct.

Since the above battery module can reduce the wiring space of the voltage detection line, the battery module has an advantage that the lateral width of the gas duct disposed on the electrode surface can be widened to smoothly eject the exhaust gas and prevent gas leakage. Safety can be ensured by preventing gas leakage because an increase in the internal pressure of the gas duct is reduced. The wiring space of the voltage detection line can be reduced because the voltage detection line can be branched to two electronic circuit blocks and wired, and the number of voltage detection lines connected to each electronic circuit block can be reduced.

In a battery module according to a fourth exemplary embodiment of the present invention, a voltage detection line is disposed on both sides of a gas duct.

In the above battery module, the voltage detection line connected to each electronic circuit block can be wired separately on both sides of the gas duct, Therefore, the battery module has an advantage that the wiring space on both sides of the gas duct can be further reduced.

In a battery module according to a fifth exemplary embodiment of the present invention, an electronic circuit block includes a cell balance adjustment circuit which adjusts a cell balance among each battery cell, and the cell balance adjustment circuit adjusts the cell balance among each battery cell by energizing a voltage detection line.

The above battery module has an advantage that each battery cell can be promptly cell balanced by using the voltage detection line together with the adjustment of the cell balance. This is because the cell-balancing voltage detection line can be shortened by being connected to a nearby electronic circuit block, thus reducing electrical resistance. Since the electrical resistance can be reduced by shortening the voltage detection line, a voltage drop in the wiring is reduced during cell balancing, and voltage detection accuracy is improved.

In a battery module according to a sixth exemplary embodiment of the present invention, a voltage detection line is a wire harness or a printed circuit.

In a battery module according to a seventh exemplary embodiment of the present invention, a printed circuit of a voltage detection line is a flexible printed circuit (FPC).

In the above battery module, the voltage detection line can be divided into two lines and connected to an electronic circuit block disposed nearby. Therefore, the battery module has an advantage that the voltage detection line can be shortened, the flexible printed circuit can be shortened, and mass production can be performed at low cost.

In a battery module according to an eighth exemplary embodiment of the present invention, an electronic circuit block includes a communication terminal capable of cascade-connecting a plurality of electronic circuit blocks to transmit a signal, and this communication terminal is internally connected via a coupling element that interrupts direct current and allows an alternating current signal to pass therethrough.

In the above battery module, the communication terminal is internally connected via the coupling element. Therefore, the battery module has an advantage that the communication terminal can be connected to another communication terminal and transmit a signal without adjustment to a DC level. This is particularly effective in a device in which a plurality of battery modules are connected in series. In the device in which a plurality of battery modules are connected in series, a potential difference is generated in a ground line of each battery module. Since the communication terminal of the electronic circuit block transmits a signal with the ground line as a reference potential, a communication terminal having a potential difference with respect to the ground line needs to shift the DC level of the ground line by applying a bias voltage and set the potential difference of the ground line of a connected communication terminal to a zero level, but this circuit configuration becomes correspondingly complicated. In particular, in a device in which a large number of battery modules are connected in series, since the ground line changes stepwise, equalizing the ground line with a plurality of bias voltages becomes an extremely complicated circuit configuration. Furthermore, since a bias voltage that equalizes the ground line shifts with temperature, it is necessary to control temperature characteristics extremely accurately, and the circuit configuration becomes more complicated. In the above battery module, it is not necessary to equalize the DC level of the ground line with a bias voltage, and the battery module has an advantage that a large number of battery modules can be connected in series and a communication terminal of a battery module having a potential difference with the ground line can be easily connected to transmit a signal.

In a battery module according to a ninth exemplary embodiment of the present invention, a coupling element is any one of a coupling capacitor, a transformer, and a photoelectric transmission element.

A power supply device according to a tenth exemplary embodiment of the present invention is a power supply device including a plurality of the above battery modules, in which adjacent battery modules are connected by a power line and an external communication line, the power line is connected to output terminals of the battery modules, the external communication line is connected to a communication terminal, the external communication line is connected to communication terminals located at ends of the battery modules where the power line is connected, and both the power line and the external communication line are connected to ends on the same side of the battery modules.

In a power supply device according to an eleventh exemplary embodiment of the present invention, on battery modules disposed adjacent to each other, an external communication line is connected to a pair of communication terminals disposed closest to each other.

First Exemplary Embodiment

The battery module shown in the following example is mainly optimal for a power source of an electric vehicle such as a hybrid vehicle or a plug-in hybrid vehicle that runs by both an engine and a motor, an electric automobile that runs only by a motor, and an electric motorcycle that runs by a motor. However, the battery module of the present invention is also suitable for a power source for a power storage device that is an application requiring a large output other than an electric vehicle.

Battery module 10 shown in FIGS. 1 to 4 includes battery stack 2 in which a plurality of battery cells 1 are stacked in a thickness, a pair of end plates 3 disposed at both end parts in a stacking direction of battery cells 1 of battery stack 2, bind bar 4 coupled to end plates 3 at both end parts of battery stack 2, and electronic circuit block 6 on which a voltage detection circuit is mounted which detects the voltage of battery cells 1 of battery stack 2. Furthermore, battery module 10 shown in the figures includes gas duct 5 coupled to an opening part of exhaust valve 1a provided in each battery cell 1, cover case 8 disposed above battery stack 2 and on gas duct 5, and base plate 9 disposed below the battery stack and fixing end plates 3.

(Battery Cell 1)

As shown in 2, battery cell 1 is a rectangular secondary battery having a width larger than the thickness, in other words, thinner than the width, and battery cells 1 are stacked in the thickness to form battery stack 2. Battery cell 1 is a lithium-ion secondary battery. However, the battery cell may be any other chargeable secondary battery, such as a nickel metal hydride battery and a nickel cadmium battery. In battery cell 1, positive and negative electrode plates are housed in an exterior can having a sealed structure together with an electrolyte solution. The exterior can is formed by press-molding a metal sheet made of aluminum, an aluminum alloy, or the like into a rectangular shape, and an opening part is hermetically sealed with a sealing plate. The sealing plate is made of the same aluminum or aluminum alloy as the exterior can, and fixes positive and negative electrode terminals 11, and an exhaust valve is provided between electrode terminals 11. Positive and negative electrode terminals 11 are in a state where at least one of electrode terminals 11 is insulated from the sealing plate. This battery cell 1 is provided with positive and negative electrode terminals 11 with the sealing plate as terminal surface 1X. In battery cell 1, the bottom surface and the side surface of the exterior can are covered with an insulating film.

The plurality of battery cells 1 are stacked to allow the thickness of each battery cell 1 to be aligned with the stacking direction to constitute battery stack 2. Terminal surface 1X provided with positive and negative electrode terminals 11 is disposed on the same plane, and thus the plurality of battery cells 1 are stacked to form electrode surface 2X, thus forming battery stack 2.

(Battery Stack 2)

Figure 2:
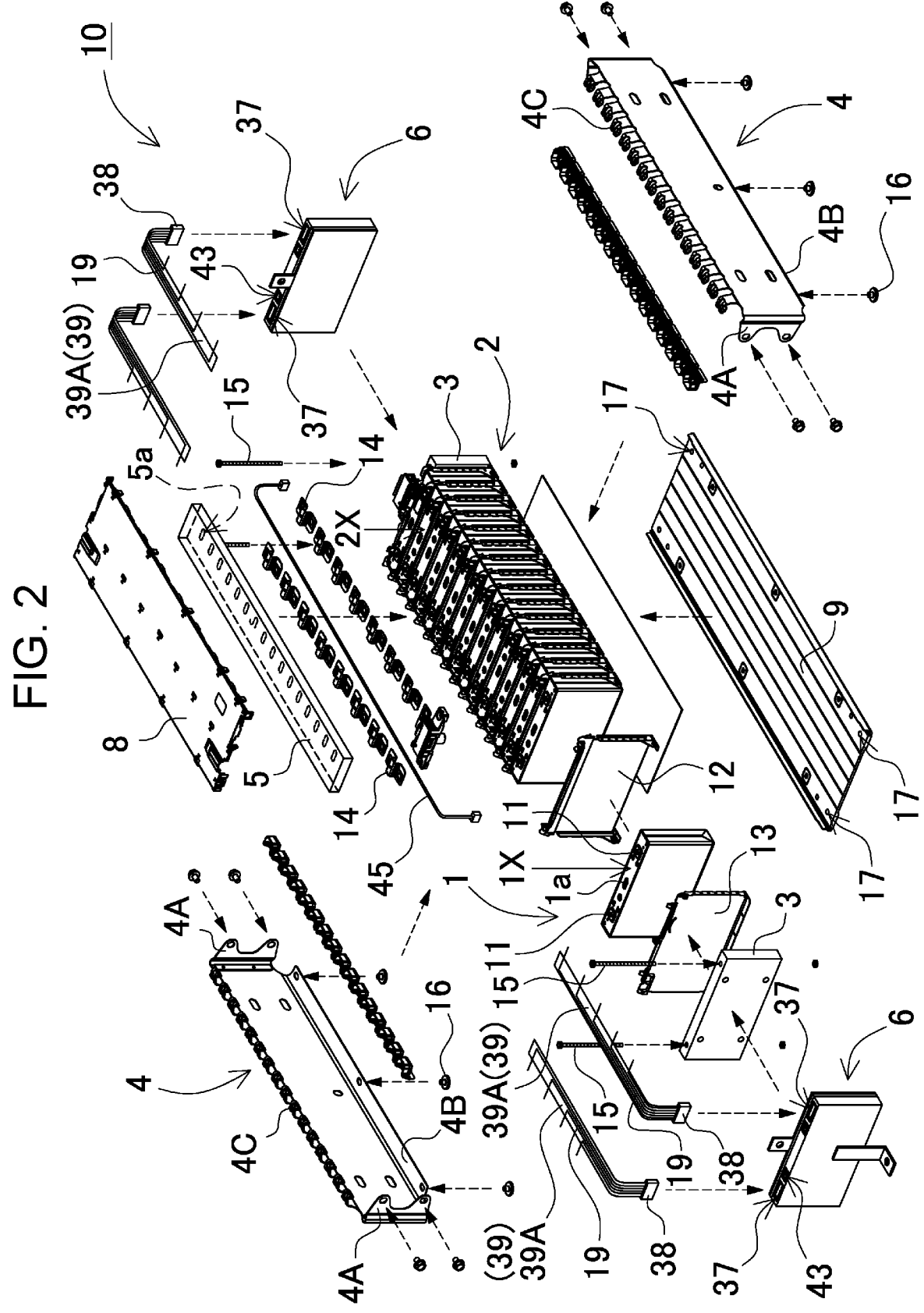
FIG. 2 is an exploded perspective view of the battery module shown in FIG. 1.

As shown in FIG. 2, in battery stack 2, insulating spacer 12 is held between stacked battery cells 1. Insulating spacer 12 in the figure is made of an insulating material such as resin formed into a thin plate shape or a sheet shape. Insulating spacer 12 shown in the figure has a plate shape having substantially the same size as the opposing surface of battery cell 1. Insulating spacer 12 is stacked between adjacent battery cells 1 and insulates adjacent battery cells 1 from each other. As the spacer disposed between adjacent battery cells 1, a spacer having a shape in which a flow path of a cooling gas is formed between the battery cell and the spacer can also be used.

In battery stack 2, bus bar 14 made of metal is connected to positive and negative electrode terminals 11 of adjacent battery cells 1, and the plurality of battery cells 1 are connected in series or in parallel, or in series and in parallel, by bus bar 14. In battery stack 2, the output voltage and the chargeable and dischargeable capacity are set as setting values by the number of battery cells 1 to be stacked. In battery stack 2, the output voltage can be increased by the number of battery cells 1 connected in series and increasing the charge and discharge capacity by the number of battery cells 1. In the battery module 10, the output voltage and the capacity are set as setting values by the number of battery cells 1 constituting battery stack 2 and the connection state of connecting in series and in parallel. Therefore, the number of battery cells 1 and the connection state are in an optimal state in consideration of the application.

Bus bar 14 is provided with a connection part (not illustrated) for connection to electrode terminal 11. Bus bar 14 is welded and connected to electrode terminal 11 by irradiating a boundary connecting the connection part and electrode terminal 11 with a laser beam. The bus bar can be connected to the electrode terminal by providing a male screw in the electrode terminal, opening a through-hole for inserting the electrode terminal, and screwing a nut into the male screw of the electrode terminal inserted in the through-hole, or can be connected to the electrode terminal by providing a female screw hole in the electrode terminal, and screwing a set screw penetrating the bus bar into the female screw hole. In battery module 10, the upper surface of battery stack 2 can be provided with a resin insulating cover (not illustrated). The insulating cover is provided with an opening part, electrode terminal 11 is exposed from this opening part, bus bar 14 of a metal sheet is connected to electrode terminal 11 exposed from the opening part of the insulating cover near the upper surface of the insulating cover, and the plurality of battery cells 1 can be connected in a predetermined array.

(End Surface Spacer 13)

In battery stack 2, end plates 3 can be disposed on both end surfaces of battery stack 2 with end surface spacer 13 interposed therebetween in order to insulate battery stack 2 from end plates 3 made of metal. End surface spacers 13 are disposed between battery stack 2 and end plates 3 to insulate end plates 3 from battery stack 2. Each end surface spacer 13 is made of an insulating material such as resin and formed into a thin plate shape or a sheet shape. End surface spacer 13 is provided with a plate part having a size capable of covering the entire opposing surface of battery cell 1, and this plate part is stacked between battery cell 1 and end plate 3 disposed at both ends of battery stack 2.

(End Plate 3)

End plates 3 are provided on both end surfaces of battery stack 2 in the stacking direction of battery cells 1, and fix battery stack 2. End plate 3 is a metal sheet and is a quadrangular plate whose outer shape is substantially equal to the outer shape of battery cell 1 or slightly larger than battery cell 1. End plate 3 can be made of a high tensile strength steel to have a tough structure. End plate 3 can be a single metal sheet, can have a structure in which a plurality of metal sheets are stacked, or can be a stack of a metal sheet and plastic. End plate 3 made of one metal sheet has a large heat capacity, and can efficiently absorb heat energy of electronic circuit block 6. In end plate 3 on which the plurality of plates are stacked, the surface to which electronic circuit block 6 is fixed is at least a metal sheet. This is because electronic circuit block 6 is fixed in a thermally coupled state and improves heat dissipation characteristics. End plate 3 can be a stacked structure of an aluminum plate and a high-tensile steel plate. This end plate can also have a structure in which the electronic circuit block is fixed with the surface as an aluminum plate, the aluminum plate and the high-tensile steel plate are stacked in a surface contact state, and heat can be efficiently conducted from the aluminum plate to the high-tensile steel plate. However, the end plate is not necessarily made of metal, and can be made of plastic having excellent strength, such as engineering plastic.

(Bind Bar 4)

Bind bar 4 extends in the stacking direction of battery cells 1, fixes both end parts to end plate 3, and fixes battery stack 2 with the pair of end plates 3. Each bind bar 4 shown in FIGS. 1 and 2 is a metal sheet having a predetermined vertical width along a side surface of battery stack 2 and a predetermined thickness. Bind bars 4 are disposed so as to oppose both side surfaces of battery stack 2. Bind bars 4 pressurize both end surfaces of battery stack 2 with a strong pressure, and dispose battery cells 1 about to swell by charging and discharging at a fixed position. As the metal sheet of bind bar 4, a high tensile strength steel is preferably used. Bind bar 4 of the metal sheet is formed into a predetermined shape by press molding.

As shown in the exploded perspective view of FIG. 2, to fix both ends of bind bar 4 to the pair of end plates 3, fixing parts 4A bent along the outer surface of end plate 3 are provided at both ends of bind bar 4 in the stacking direction of battery stack 2. Bind bar 4 fastens the pair of end plates 3 by, for example, screwing fixing parts 4A to end plates 3.

Figure 3:
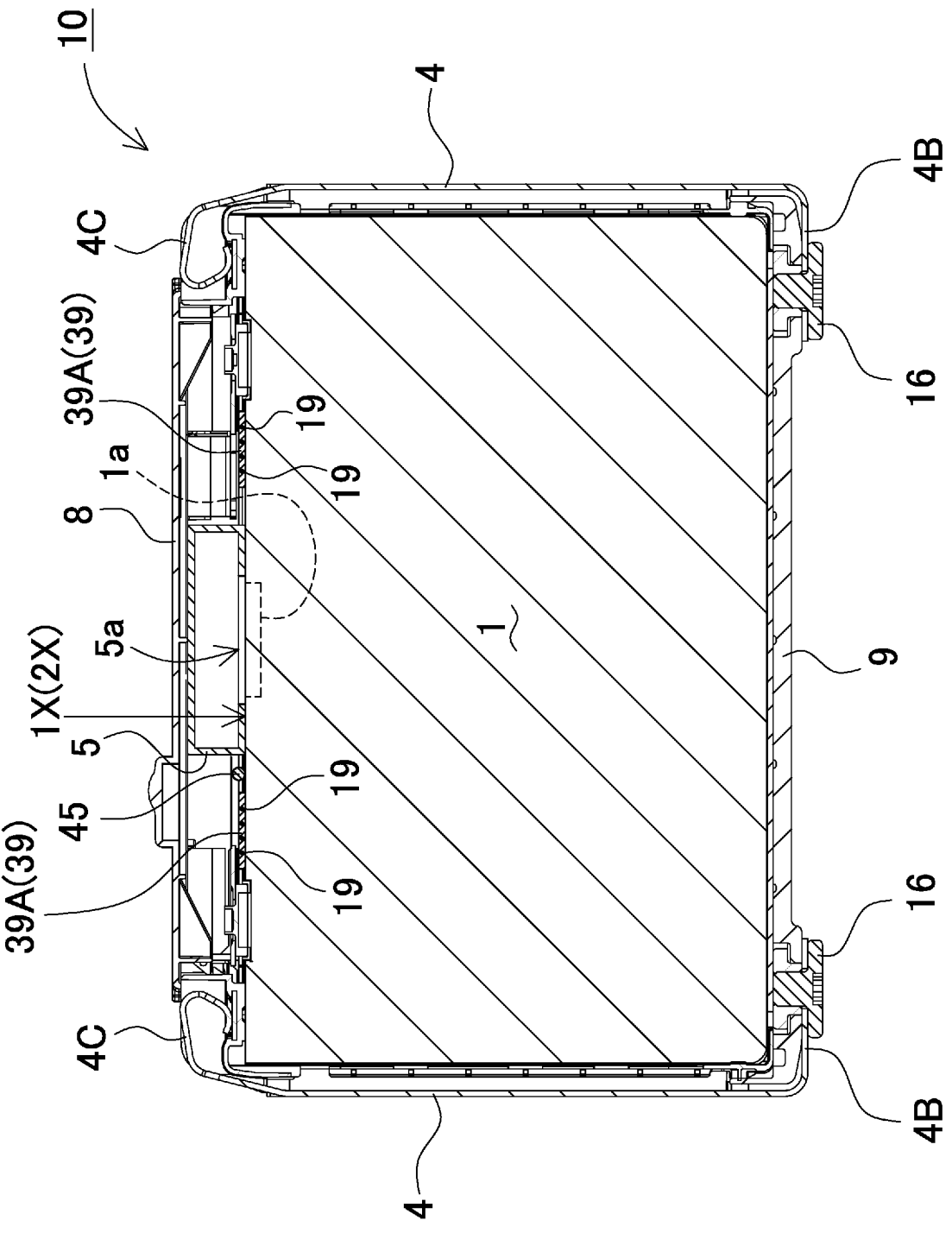
FIG. 3 is a cross-sectional view taken along line III-III of the battery module shown in FIG. 1.

Further, as shown in FIGS. 2 and 3, a lower end of bind bar 4 is bent into an L shape to form lower coupling piece 4B. This lower coupling piece 4B is stacked near the lower surface of both side parts of base plate 9 and coupled to base plate 9. Bind bar 4 is bent at an upper end to form pressing pieces 4C that press an end of the upper surface of battery stack 2. Pressing pieces 4C are separated for each battery cell 1 so that the upper surfaces of battery cells 1 of battery stack 2 can be individually pressed. This allows each pressing piece 4C to press battery cell 1 toward base plate 9 independently of adjacent pressing pieces 4C. In this way, each battery cell 1 is blocked from floating from base plate 9 and held in the height direction, and even if vibration, impact, and the like are applied to battery stack 2, each battery cell 1 can be maintained so as not to be displaced in the up-down direction. Thus, bind bar 4 covers and holds the corners of the upper and lower surfaces of battery stack 2 on both left and right side parts of battery stack 2.

A known structure can be appropriately used as the shape of bind bar 4 and the fastening structure with end plate 3. For example, both ends of the bind bar may be formed into a flat plate shape without being bent into an L shape and may be screwed with a side surface of the end plate. Alternatively, a part where the bind bar opposes the side surface of the end plate may have an engagement structure to be engaged in a stepped manner, and the bind bar is further screwed in a state of being locked to the side surface of the end plate with a locking structure.

An insulating sheet may be interposed between bind bar 4 and battery stack 2. The insulating sheet is made of a material having an insulating property such as a resin, and provides insulation between bind bar 4 made of metal and battery cell 1.

(Base Plate 9)

As shown in FIGS. 1 to 3, base plate 9 is disposed on the bottom surfaces of battery stack 2 and end plate 3. End plate 3 is fixed to base plate 9, and more preferably, the lower end part of bind bar 4 is also fixed to base plate 9. End plate 3 and bind bar 4 are fixed to base plate 9 via fixing screws 15 and 16. Fixing screw 15 for fixing end plate 3 penetrates end plate 3 in the up-down direction and fixes end plate 3 to base plate 9. Fixing screw 16 for fixing bind bar 4 also penetrates lower coupling piece 4B, which is a lower end part of bind bar 4, and is fixed to base plate 9.

In battery stack 2, each battery cell 1 is disposed in a thermally coupled state with base plate 9, in contact with base plate 9. Battery cell 1 thermally coupled to base plate 9 dissipates heat energy to base plate 9. Base plate 9 can be forcibly cooled to further efficiently dissipate heat energy of battery cell 1. Although not illustrated, forcibly cooled base plate 9 can be forcibly cooled by circulating a refrigerant or a coolant inside of base plate 9. The base plate can also be forcibly cooled by providing a heat dissipation fin on the lower surface. The base plate can also be forcibly cooled by a cooling plate stacked in a surface contact state on the lower surface of the base plate. The cooling plate can be forcibly cooled by circulating a refrigerant or a coolant inside of the cooling plate.

(Gas Duct 5)

Figure 4:
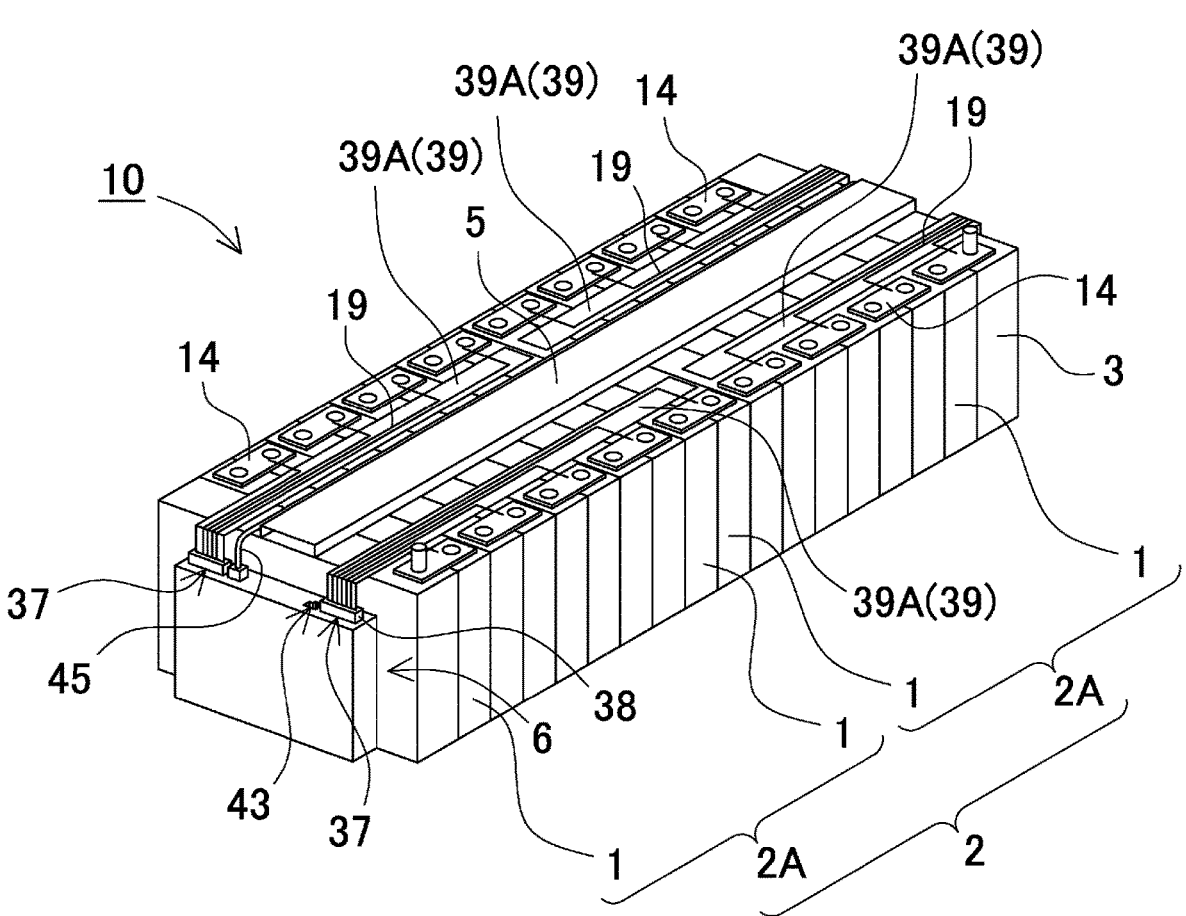
FIG. 4 is a broad perspective view of the battery module according to the first exemplary embodiment of the present invention.

As shown in FIGS. 3 and 4, gas duct 5 is disposed at a position opposite to the upper surface of battery cell 1, that is, terminal surface 1X of battery cell 1, and ejects the exhaust gas ejected from exhaust valve 1a to the outside. Gas duct 5 shown in FIG. 4 is disposed at the center of electrode surface 2X of battery stack 2 extending in the stacking direction of battery cells 1. Gas duct 5 has a cylindrical shape with an inner capacity for smoothly ejecting the discharged material ejected from the opening part of exhaust valve 1a, opens at a lower surface, and is coupled to the opening part of exhaust valve 1a of each battery cell 1. Gas duct in FIG. 4 has a rectangular cylinder shape with a horizontally wide rectangular cross section. So as to eject the exhaust gas ejected from exhaust valve 1a to the outside, gas duct 5 is disposed on the upper surface of battery stack 2 in close contact with the upper surface of battery stack 2 so that a gap cannot be formed between the gas duct and terminal surface 1X of battery cell 1 and opening part 5a opening on the lower surface is coupled to exhaust valve 1a of each battery cell 1. Gas duct 5 can be disposed so as not to leak the exhaust gas by disposing a packing, a sealing material, or the like between the gas duct and terminal surface 1X.

Although not illustrated, the gas duct can be configured by a collective duct disposed on the upper surface of the battery stack, the gas duct extending in the stacking direction of the battery cells, and with a branch duct coupled to the collective duct and having a tip coupled to the exhaust valve. In this gas duct, the collective duct can be disposed away from the terminal surface, and the tip of the branch duct can be coupled to the opening part of the exhaust valve.

(Electronic Circuit Block 6)

Figure 5:
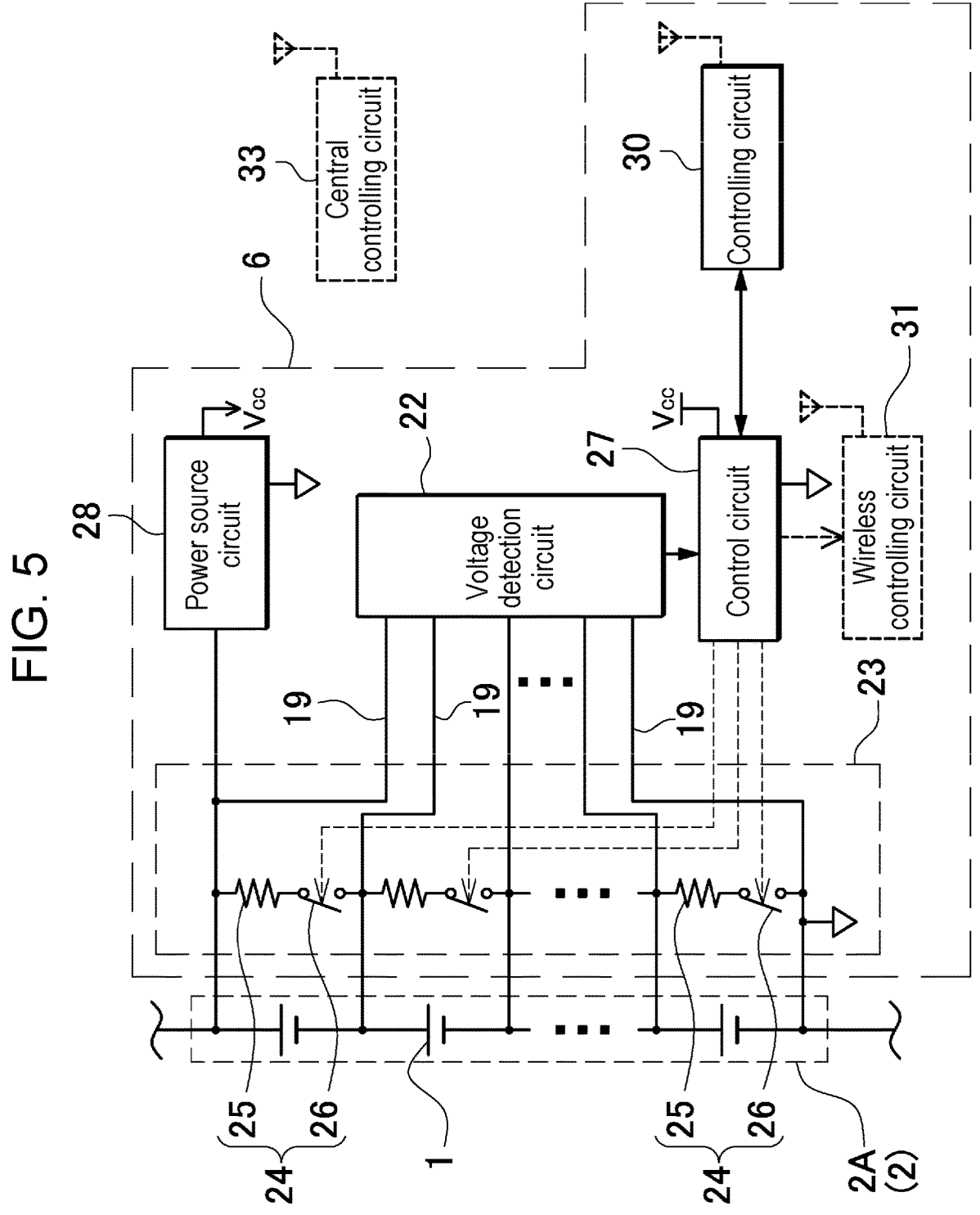
FIG. 5 is a circuit diagram showing an example of an electronic circuit block.
Figure 6:
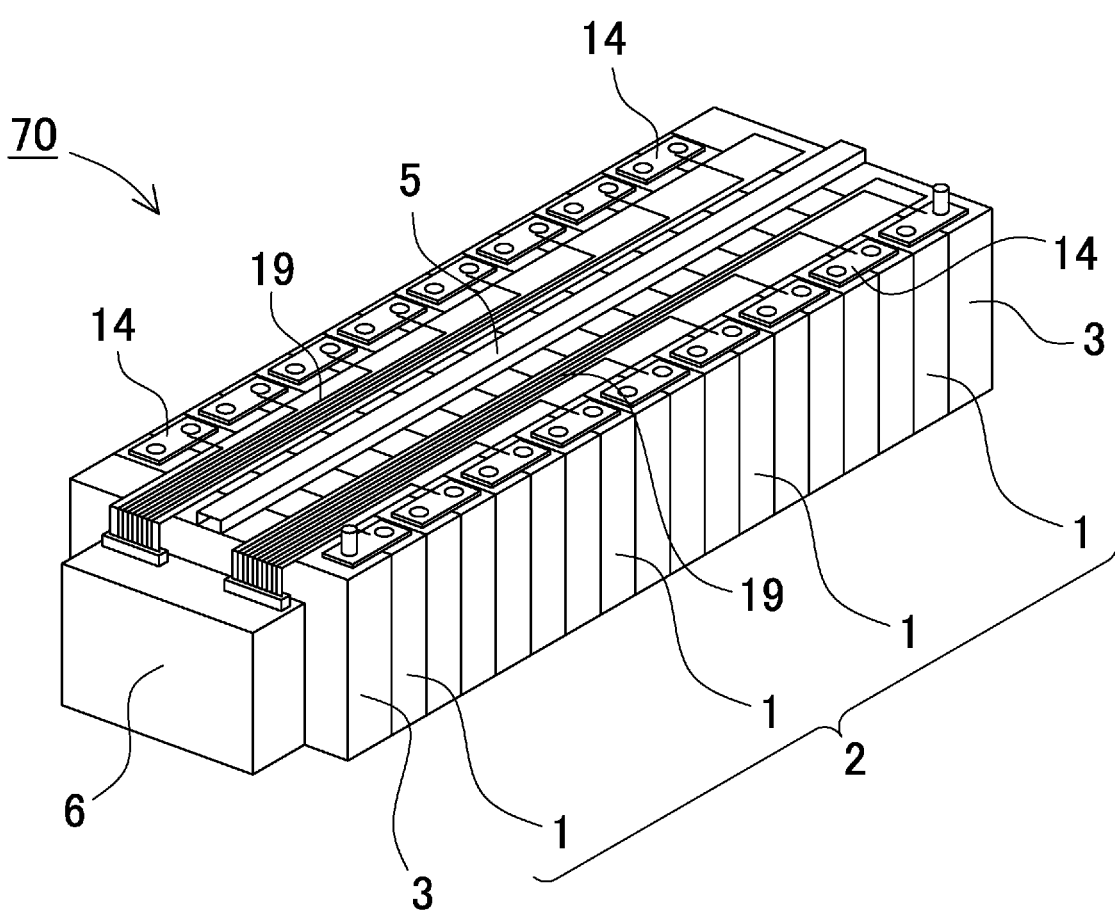
FIG. 6 is a broad perspective view of a battery module according to a reference example.

Battery module 10 in FIGS. 2 and 4 includes two electronic circuit blocks 6. The two electronic circuit blocks 6 are fixed to the outer surfaces of both end plates 3 that pressurize and fix battery stack 2 from both ends. As shown in FIG. 5, the two electronic circuit blocks 6 each include voltage detection circuit 22 that detects the voltage of battery cells 1. As shown in FIG. 5, voltage detection circuit 22 of each electronic circuit block 6 is connected to each battery cell 1 via voltage detection line 19 and detects the voltage of battery cells 1. In battery module 10 in which electronic circuit block 6 is divided into two and disposed on end plates 3, voltage detection line 19 can be connected to battery cells 1 and a nearby electronic circuit block 6, so that voltage detection line 19 can be shortened as compared with battery module 70 including one electronic circuit block 6 shown in FIG. 6 as a reference example. Battery module 10 in FIG. 4 is partitioned into two battery units 2A in the middle in the stacking direction of battery cells 1, and battery cells 1 of each battery unit 2A are connected to a separate electronic circuit block 6 via voltage detection line 19, In battery module 10 in which battery stack 2 is divided into two at the center, the longest voltage detection line 19 can be shortened to ½ of the length of the battery module including one electronic circuit block 6 shown in FIG. 6.

In battery module 10 in FIG. 4, voltage detection line 19 is wired on both sides of gas duct 5 along side edges of gas duct 5. In this battery module 10, the number of voltage detection lines 19 wired on both sides of gas duct 5 can be reduced, and the wiring space of voltage detection lines 19 can be narrowed. Voltage detection lines 19 having a narrow wiring space can widen the lateral width of gas duct 5 disposed in the center of the battery module to smoothly eject the exhaust gas and prevent gas leakage. A plurality of voltage detection lines 19 is set as a wire harness or printed circuit 39 and wired on the upper surface of battery stack 2. In particular, battery module 10 in which printed circuit 39 of voltage detection lines 19 is flexible printed circuit (FPC) 39A has an advantage that the wiring space of voltage detection lines 19 can be made extremely thin.

Figure 7:
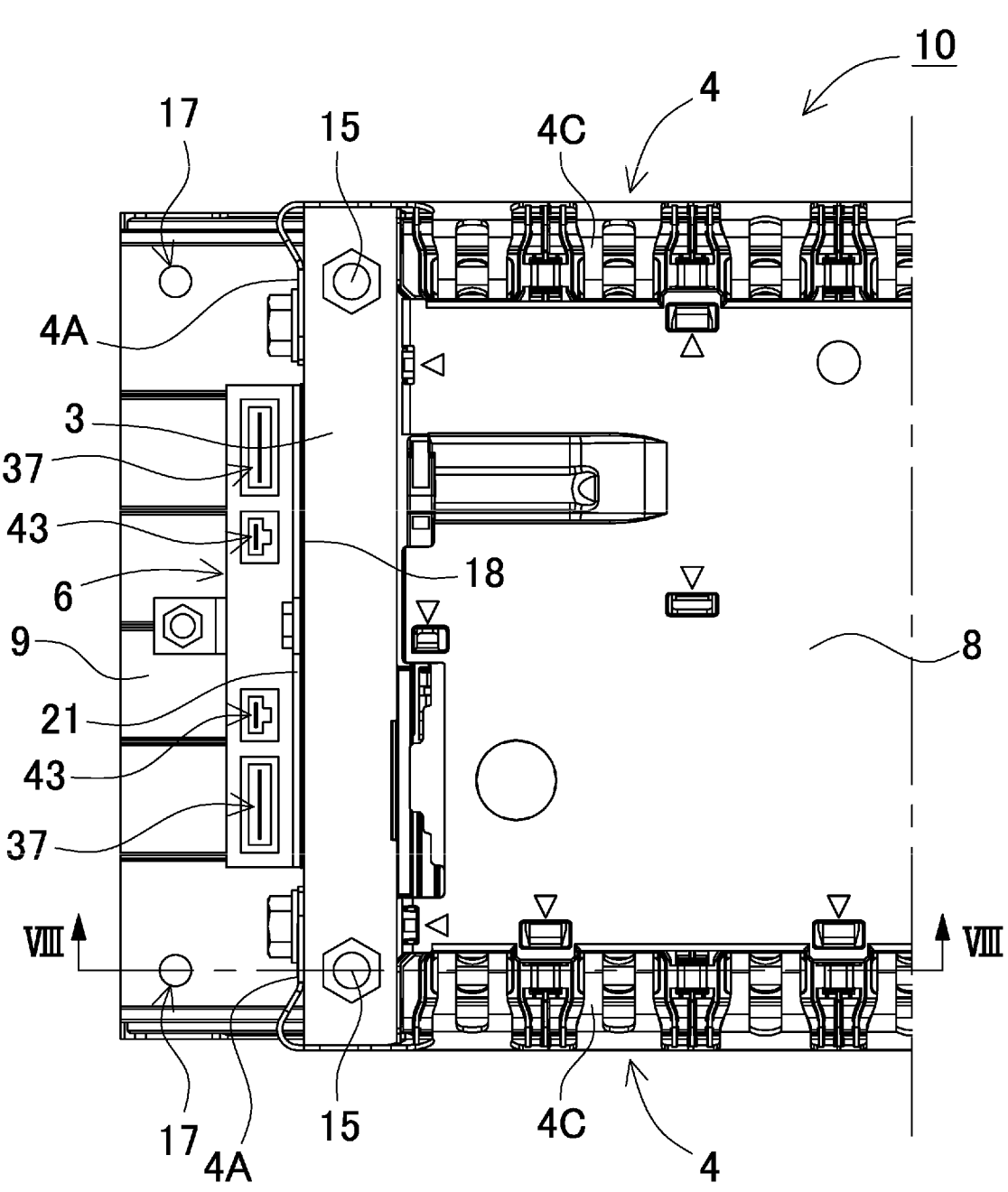
FIG. 7 is a plan view showing an end part of the battery module shown in FIG. 1.

Electronic circuit block 6 shown in FIGS. 2, 4, and 7 includes connection terminal 37 for connecting voltage detection line 19 which is flexible printed circuit 39A. Flexible printed circuit 39A in the figures includes connector 38 for connecting to electronic circuit block 6 at one end, and this connector 38 is coupled to connection terminal 37 provided in electronic circuit block 6 so as to enable simple and reliable connection. Electronic circuit block 6 shown in the figures has a thin box shape so that the entire outer shape can be disposed along the outer surface of the end plate, and connection terminal 37 for coupling connector 38 is provided at both ends of the upper surface of the electronic circuit block. This structure allows flexible printed circuit 39A connected to connection terminal 37 to be conveniently wired at a position not interfering with gas duct 5. However, the connection terminal may be disposed at the center of the upper surface of the box-shaped electronic circuit block. In this case, a tip portion of the voltage detection line (flexible printed circuit) connected to the connection terminal is bent into a crank shape, so that the main body portion of the voltage detection line (flexible printed circuit) can be wired on both sides of the gas duct while the connector is connected to the connection terminal.

Figure 8:
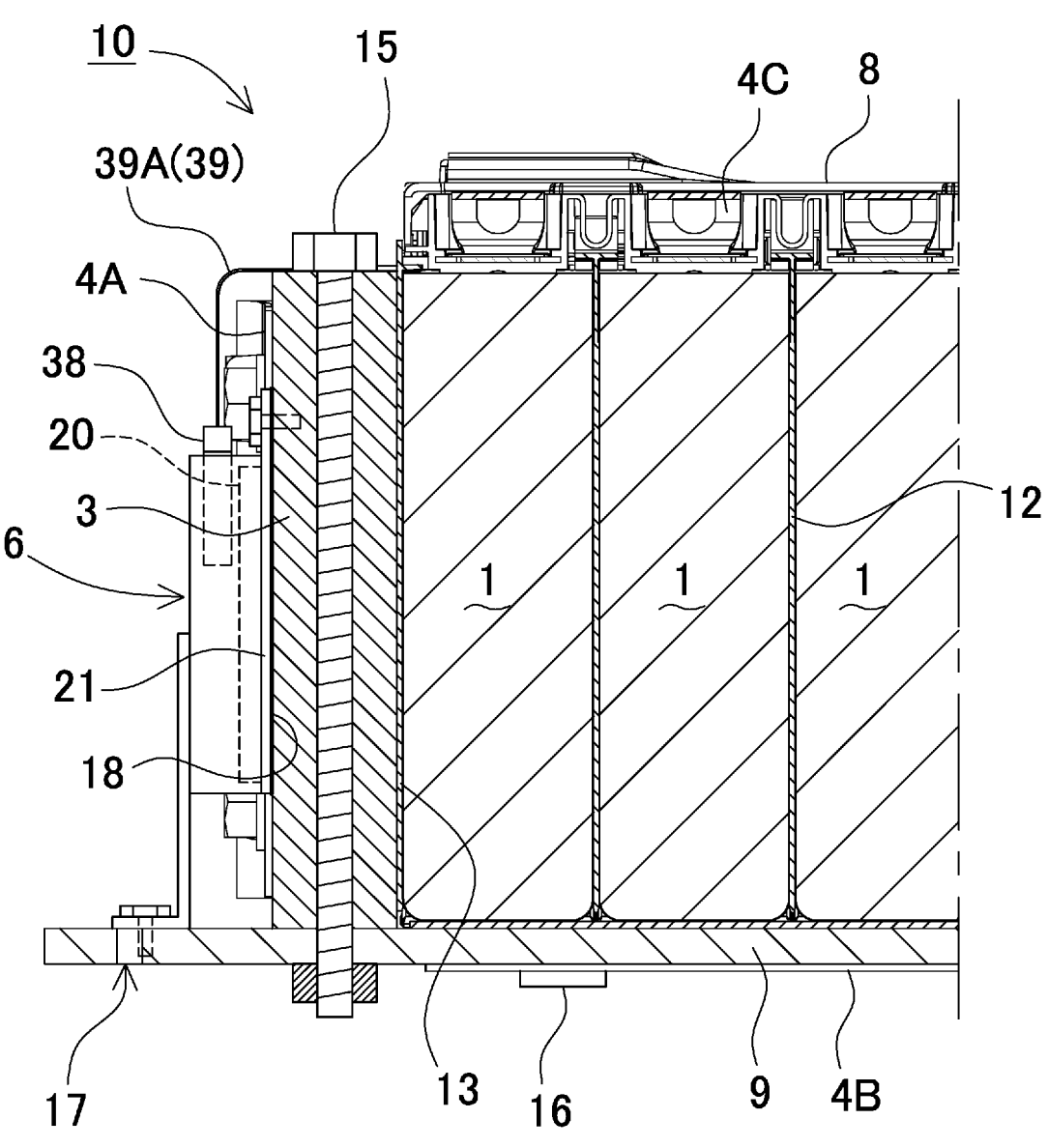
FIG. 8 is a cross-sectional view taken along line VIII-VIII of the battery module shown in FIG. 7.

In electronic circuit block 6, electronic components for implementing voltage detection circuit 22 are mounted on circuit board 20 (refer to FIGS. 5 and 8). However, electronic circuit block 6 can be a block in which, with all electronic circuits including voltage detection circuit 22 as an integrated circuit, the integrated circuit is embedded in a package of an insulation material. As shown in FIGS. 5 and 8, electronic circuit block 6 can be a block in which a metal plate of radiator 21 is disposed on the surface. Radiator 21 is thermally coupled to a heat generating component built into electronic circuit block 6, for example, a discharge resistor of a cell balance adjustment circuit and a semiconductor element such as a field effect transistor (FET) that controls a current, and dissipates heat energy of these heat generating components to the outside. Electronic circuit block 6 has a plate shape as a whole by mounting the electronic components on circuit board 20, or has a plate shape by embedding the integrated circuit in the package.

Electronic circuit block 6 including voltage detection circuit 22 detects the voltage of battery cell 1 whose voltage fluctuates by charging and discharging, and prevents overcharge and overdischarge of each battery cell 1 with the battery voltage as a set range. In battery module 10, electronic circuit block 6 may include controlling circuit 30 that controls a charge and discharge current of battery stack 2. This controlling circuit 30 controls the charge and discharge current to prevent overcharge and overdischarge of battery cell 1. Voltage detection circuit 22 transmits voltage data of battery cell 1 to the controlling circuit 30. The electronic circuit block can transmit battery information to an externally provided controlling circuit without providing a controlling circuit, and can control a charge and discharge current of battery module 10 with the external controlling circuit.

Voltage detection circuit 22 preferably detects the voltage of all battery cells 1. However, it is possible for voltage detection circuit 22 not to necessarily detect the voltage of all battery cells 1 but to, for example, divide battery cells 1 constituting battery stack 2 into a plurality of battery units and detect the voltage of each battery unit. A battery unit in which the plurality of battery cells 1 are connected in parallel can detect the voltage of the battery unit and detect the voltage of all the battery cells. A battery unit in which the plurality of battery cells are connected in series detects the voltage of the battery unit and detects the total voltage of the battery cells connected in series. The battery unit in which the plurality of battery cells are connected in series includes 2 to 5 battery cells. Since this battery unit detects the voltage of the battery unit and detects the total voltage of the 2 to 5 battery cells 1, the voltage of the battery cells becomes ½ to ⅕ of the total detected voltage. The voltage of battery cell 1 changes depending on the remaining capacity. The voltage of battery cell 1 becomes higher than a preset maximum voltage when overcharged, and becomes lower than a minimum voltage when overdischarged. When battery cell 1 is overcharged or overdischarged, the electrical characteristics deteriorate and the safety also deteriorates. Voltage detection circuit 22 detects the voltage of battery cell 1 and transmits the voltage to controlling circuit 30, and controlling circuit 30 controls the charge and discharge current such that the voltage of battery cell 1 falls within a set range.

As battery module 10 repeats charging and discharging, the remaining capacity or voltage of each battery cell 1 becomes imbalanced. Battery cells 1 connected in series are charged and discharged with the same current. Battery cells 1 are charged and discharged at the same current, but the electrical characteristics of each battery cell 1 are not completely the same. Therefore, in battery module 10 in which the plurality of battery cells 1 are connected in series, the voltage and remaining capacity of each battery cell 1 becomes imbalanced as charging and discharging are repeated. An imbalance in battery cells 1 causes overcharge or overdischarge of a specific battery cell 1. Since battery module 10 simultaneously charges and discharges all battery cells 1, the imbalance of battery cells 1 causes overcharge or overdischarge of the specific battery cell 1. Overcharge and overdischarge of battery cells 1 deteriorate the electrical characteristics of battery cells 1, cause deterioration, and deteriorate the safety of battery module 10. Cell balance adjustment circuit 23 eliminates the voltage imbalance of battery cells 1.

Electronic circuit block 6 is also mounted with cell balance adjustment circuit 23 that equalizes the voltage of battery cells 1. Using voltage detection line 19, cell balance adjustment circuit 23 discharges a high-voltage battery cell 1, charges a low-voltage battery cell 1, and equalizes the voltage of battery cells 1 to eliminate the imbalance. An example of a circuit diagram of cell balance adjustment circuit 23 is shown in FIG. 5. Since a battery cell 1 having a large remaining capacity has a high voltage, the high-voltage battery cell 1 can be discharged to equalize the remaining capacity. Cell balance adjustment circuit 23 shown in this figure discharges the high-voltage battery cell 1 with discharge resistor 25 to eliminate the imbalance. However, cell balance adjustment circuit 23 is not specified as a circuit that discharges battery cell 1 with discharge resistor 25. For example, the cell balance adjustment circuit can eliminate a voltage difference between battery cells by discharging a high-voltage battery cell to a condenser or a capacitor such as a power storage battery, storing the electric power in the capacitor, and discharging the charge of this capacitor to a low-voltage battery cell. The cell balance adjustment circuit can convert the voltage of the high-voltage battery cell with a DC/DC converter, and equalize the voltage by charging the low-voltage battery cell while controlling the current.

Cell balance adjustment circuit 23 in FIG. 5 includes discharge circuit 24 in which switching elements 26 are connected in series to discharge resistors 25, and connects control circuit 27 that detects each cell voltage and controls switching elements 26 to be on or off and voltage detection circuit 22 that detects the cell voltage of each battery cell 1. Discharge circuit 24 of discharge resistor 25 and switching element 26 is connected in parallel to each battery cell 1. In this cell balance adjustment circuit 23, when the cell voltage of battery cell 1 increases, control circuit 27 switches switching element 26 to on, discharge resistor 25 discharges battery cell 1, and the voltage of battery cell 1 is reduced and equalized.

Cell balance adjustment circuit 23 is driven by receiving supply of electric power from battery stack 2. Cell balance adjustment circuit 23 in the figure operates by an output voltage (Vcc) of power source circuit 28 that receives the supply of electric power from battery stack 2. The voltage of battery stack 2 can be stepped down by a DC/DC converter that is, for example, power source circuit 28, and supplied to cell balance adjustment circuit 23. According to this circuit configuration, even when the voltage of battery stack 2 is high, the voltage can be supplied as an optimal voltage to cell balance adjustment circuit 23.

Control circuit 27 compares the cell voltage of each battery cell 1, and controls switching element 26 so as to equalize the cell voltage of all battery cells 1. This control circuit 27 discharges by switching, to ON, switching element 26 of discharge circuit 24 connected to battery cell 1 having an excessive voltage. The voltage of battery cell 1 decreases as battery cell 1 is discharged. Switching element 26 is switched from on to off when the voltage of battery cell 1 decreases to be balanced with other battery cells 1. When switching element 26 becomes off, the discharge of battery cell 1 is stopped, Thus, control circuit 27 discharges battery cell 1 having a high cell voltage and balances the cell voltages of all battery cells 1.

Cell balance adjustment circuit 23 described above equalizes the voltage of all battery cells 1. However, after dividing all the battery cells into a plurality of battery units and equalizing the voltage of the battery cells constituting the battery units with a cell cell balance adjustment circuit, the battery module can equalize the voltages of all the entire battery units with a unit cell balance adjustment circuit. The unit cell balance adjustment circuit detects the unit voltage of each battery unit, discharges a battery unit having a high unit voltage, and equalizes the voltage of each battery unit.

Electronic circuit block 6 is fixed to end plate 3 and dissipates heat to end plate 3. Electronic circuit block 6 includes a semiconductor element such as an FET that controls a current and a heat generating element such as a discharge resistor. Electronic circuit block 6 can reduce temperature rise by dissipating the heat energy of the heat generating element to end plate 3. The temperature rise of electronic circuit block 6 adversely affects a built-in heat generating element and the like. In particular, cell balance adjustment circuit 23 discharges battery cell 1 with discharge resistor 25 and lowers the voltage, but discharge resistor 25 generates heat due to Joule heat of the discharge current. Discharge resistor 25 can rapidly decrease the voltage of battery cell 1 in a short time by increasing the current, but Joule heat that causes discharge resistor 25 to generate heat increases in proportion to the square of the discharge current. Therefore, in cell balance adjustment circuit 23 capable of rapidly decreasing the voltage of battery cell 1 and shortening the equalization time, heat energy to generate heat increases. Cell balance adjustment circuit 23 equalizes battery cell 1 at a timing when battery cell 1 is not charged or discharged, and hence it is required to make the equalization time shorter. Since the equalization time can be shortened by increasing the current of discharge resistor 25, how efficiently the heat generation energy of discharge resistor 25 can be dissipated becomes an important factor for specifying the equalization time.

Since the temperature rise due to the heat generation energy of the heat generating component results in a failure of the component, design is performed such that the entire heat generating component is enlarged so as not to abnormally rise in temperature, or the heat generation amount per unit time of discharge resistor and the like is reduced. When electronic circuit block 6 is downsized so as to enable disposition in a narrow space, a heat dissipation area is reduced, heat dissipation energy is reduced, and a temperature rise is increased. For this reason, as in a conventional battery module, an electronic circuit block that is downsized so as to enable disposition in a small space between a gas duct and a bus bar has a small heat dissipation area, so that it is necessary to reduce heat dissipation energy. Therefore, in the electronic circuit block disposed in a narrow space, it is necessary to reduce the heat dissipation energy, and the time for equalizing the battery cells becomes long. A battery module in which a large number of battery cells are stacked is used for a large-capacity application such as a battery module for driving a motor for a vehicle and a power source of a power storage device, and thus the capacity of the battery cell is also considerably large. In the large-capacity battery module, the capacity imbalance due to the battery cell voltage imbalance relatively increases as the battery cell capacity increases. Therefore, in this type of battery module, since the equalization time of the battery cells is shortened as much as possible and the battery cells are quickly equalized, it is possible to increase the discharge current, but the increase in the discharge resistor increases the heat generation energy, and it is thus required to increase the heat dissipation area. Therefore, in order to dispose the electronic circuit block in a narrow space, downsizing is required, and in order to shorten the equalization time by discharging with a large current, it is necessary to increase the heat dissipation area and increase the size. For this reason, in the electronic circuit block, downsizing and shortening of the equalization time are characteristics that contradict each other, and both the characteristics cannot be satisfied. There is a need for solving a contradictory problem of downsizing that is required for disposing the electronic circuit block in a limited space and upsizing for having a high discharge capability.

In battery module 10 in which electronic circuit block 6 is fixed to end plate 3 in a thermally coupled state and end plate 3 is used in combination with heat dissipation of electronic circuit block 6, heat generation energy of electronic circuit block 6 can be efficiently dissipated by end plate 3. In particular, end plate 3 has a very large heat capacity, and has a small temperature rise with respect to absorbed heat energy, so that the equalization time of battery cells 1 can be shortened. Furthermore, end plate 3 has a large surface area and large heat dissipation energy from the surface, and this also reduces the temperature rise. Furthermore, in the structure for fixing end plate 3 to base plate 9, heat energy is conducted from end plate 3 to base plate 9, and the temperature rise is further reduced. In the structure in which base plate 9 is forcibly cooled or cooling plates are stacked on base plate 9, end plate 3 is forcibly cooled by base plate 9, the temperature rise is further reduced, the cooling effect of electronic circuit block 6 is further increased, and the temperature rise of electronic circuit block 6 is reduced to an ideal state.

In battery module 10 of FIGS. 7 and 8, electronic circuit block 6 is fixed to the outer surface of end plate 3. This battery module 10 has an advantage that heat generation energy of electronic circuit block 6 can be conducted to fixed end plate 3 and dissipate heat, and heat can also be dissipated from the exposed surface to the outside air to dissipate heat more efficiently. The outer shape of electronic circuit block 6 fixed to the surface of end plate 3 is smaller than the outer shape of end plate 3, and does not protrude from the outer peripheral edge of end plate 3. In this battery module 10, while electronic circuit block 6 is disposed on end plate 3, electronic circuit block 6 does not enlarge the outer shape of battery module 1 and electronic circuit block 6 can efficiently dissipate heat while being downsized.

In battery module 10 of FIG. 7, the thickness of electronic circuit block 6 is set to a dimension that does not protrude from the tip edge of base plate 9 to the outer surface in plan view. In this battery module 10, while electronic circuit block 6 is fixed to end plate 3, the outer shape in plan view does not become larger than that of base plate 9, and electronic circuit block 6 can be disposed at an ideal position while being downsized as a whole.

End plate 3 is pressed from the inside with a strong pressure by battery cell 1 exhibiting a physical property of expanding when charged and discharged. End plate 3 pressed against battery stack 2 and having both side edges fixed by bind bar 4 is curved by the pressure of battery stack 2. When electronic circuit block 6 deforms by curved end plate 3, the configuration components of electronic circuit block 6 are adversely affected. For example, electronic circuit block 6 in which the electronic component is fixed to the circuit board causes adverse effects such as curving the circuit board and damaging the conducting part. In electronic circuit block 6 of FIG. 8, a part of the upper edge part, preferably the center part, is locally fixed to end plate 3, and the lower part is fixed to the tip portion of base plate 9. In this battery module 10, even if battery cell 1 expands and end plate 3 deforms, the deformation does not adversely affect electronic circuit block 6. In battery module 10 described above, since a part of the upper edge part of electronic circuit block 6 is locally fixed to end plate 3, even when end plate 3 is curved, electronic circuit block 6 does not deform together. Since the lower part of electronic circuit block 6 is fixed to the tip portion of base plate 9, electronic circuit block 6 is reliably fixed with the upper part and the lower part. That is, electronic circuit block 6 is firmly fixed to end plate 3 and base plate 9 without being adversely affected by deformation of end plate 3.

Battery module 10 in which electronic circuit block 6 is fixed to the tip end of base plate 9 has an advantage that electronic circuit block 6 is disposed at a position different from fixing hole 17 in plan view, whereby base plate 9 can be easily and reliably fixed to usage equipment such as a chassis of a vehicle while fixing electronic circuit block 6 to end plate 3. In battery module 10 of FIG. 7, fixing holes 17 are provided on both side parts of base plate 9, and an interval between fixing holes 17 is set to a horizontal width in which electronic circuit block 6 can be disposed therebetween.

Electronic circuit block 6 is preferably fixed to end plate 3 in an insulated manner. This electronic circuit block 6 is fixed by disposing insulating sheet 18 between electronic circuit block 6 and end plate 3. As an elastic sheet made of a rubber-like elastic body, insulating sheet 18 can always hold curved end plate 3 and electronic circuit block 6 in a thermally coupled state. While electronic circuit block 6 fixed to end plate 3 in an insulated manner has a structure in which metal radiator 21 and the like are exposed to the surface and can efficiently dissipate heat, electronic circuit block 6 can improve insulation characteristics with respect to battery stack 2 disposed inside end plate 3, and thus reliability can be raised. Battery module 10 in which end plates 3 are disposed on both end surfaces of battery stack 2 can prevent electric shock and electric leakage by insulating end plates 3 from a ground line. High-voltage battery stack 2 is disposed inside end plate 3 insulated from the ground line. End plate 3 insulated from battery stack 2 maintains high electric leakage resistance with battery stack 2, but the electric leakage resistance may decrease due to various factors. For example, dew condensation water between end plate 3 and battery stack 2 causes a decrease in electric leakage resistance. Electronic circuit block 6 disposed in an insulated manner from end plate 3 is insulated from end plate 3 even when contact resistance between end plate 3 and battery stack 2 is lowered, so that adverse effects such as electric leakage and electric shock are prevented to ensure high safety and reliability. However, since the end plate is insulated from the battery stack, the end plate can be connected to the ground line.

In battery module 10 described above, the heat of the heat generating component of cell balance adjustment circuit 23 of electronic circuit block 6 can be efficiently dissipated by end plate 3, so that battery module 10 has an advantage that cell balance adjustment circuit 23 can quickly equalize battery cells 1. This is because the power consumption of cell balance adjustment circuit 23 is increased to discharge battery cell 1 with a large current, and the voltage of a high-voltage battery cell 1 can be rapidly reduced. Cell balance adjustment circuit 23 discharges the high-voltage battery cell 1 to eliminate voltage imbalance or charges a low-voltage battery cell 1 with the high-voltage battery cell 1 and thus equalizes. The circuit that discharges and equalizes the high-voltage battery cell 1 discharges the high-voltage battery cell 1 with discharge resistor 25, and cell balance adjustment circuit 23 that charges the low-voltage battery cell 1 with the high-voltage battery cell 1 supplies electric power from the high-voltage battery cell 1 to the low-voltage battery cell 1 and thus equalizes. In the circuit that discharges and equalizes battery cell 1 by discharge resistor 25, discharge resistor 25 that discharges battery cell 1 and the semiconductor element that is switching element 26 that controls the discharge current of this discharge resistor 25 generate heat. This circuit has a structure for efficiently discharging the heat energy of discharge resistor 25 and the semiconductor element, and can shorten the time for equalizing by increasing the discharge current of discharge resistor 25 and the semiconductor element. When the discharge current is increased, the heat generation amount is also increased. Therefore, efficient discharge can increase the discharge current. In the cell balance adjustment circuit that charges the low-voltage battery cell with the high-voltage battery cell, the semiconductor element that controls the current to be charged from the high-voltage battery cell to the low-voltage battery cell generates heat, and therefore the time for equalization can be shortened by increasing the current of this semiconductor element.

As indicated by a chain line in FIG. 5, electronic circuit block 6 fixed to end plate 3 is provided with wireless communication circuit 31, and this wireless communication circuit 31 can wirelessly transmit, to central controlling circuit 33, information such as a battery voltage detected by voltage detection circuit 22. This electronic circuit block 6 does not need to be connected to central controlling circuit 33 by an external connection line, and has an advantage that wiring can be simplified. In particular, in the battery module mounted on a vehicle, electronic circuit block 6 can wirelessly transmit information to central controlling circuit 33 that controls the running motor of the vehicle. The battery module having this structure can simplify a complicated wire harness unique to a vehicle, prevent adverse effects such as contact failure that cannot be avoided in the wire harness, and achieve high reliability over a long period of time.

Figure 9:
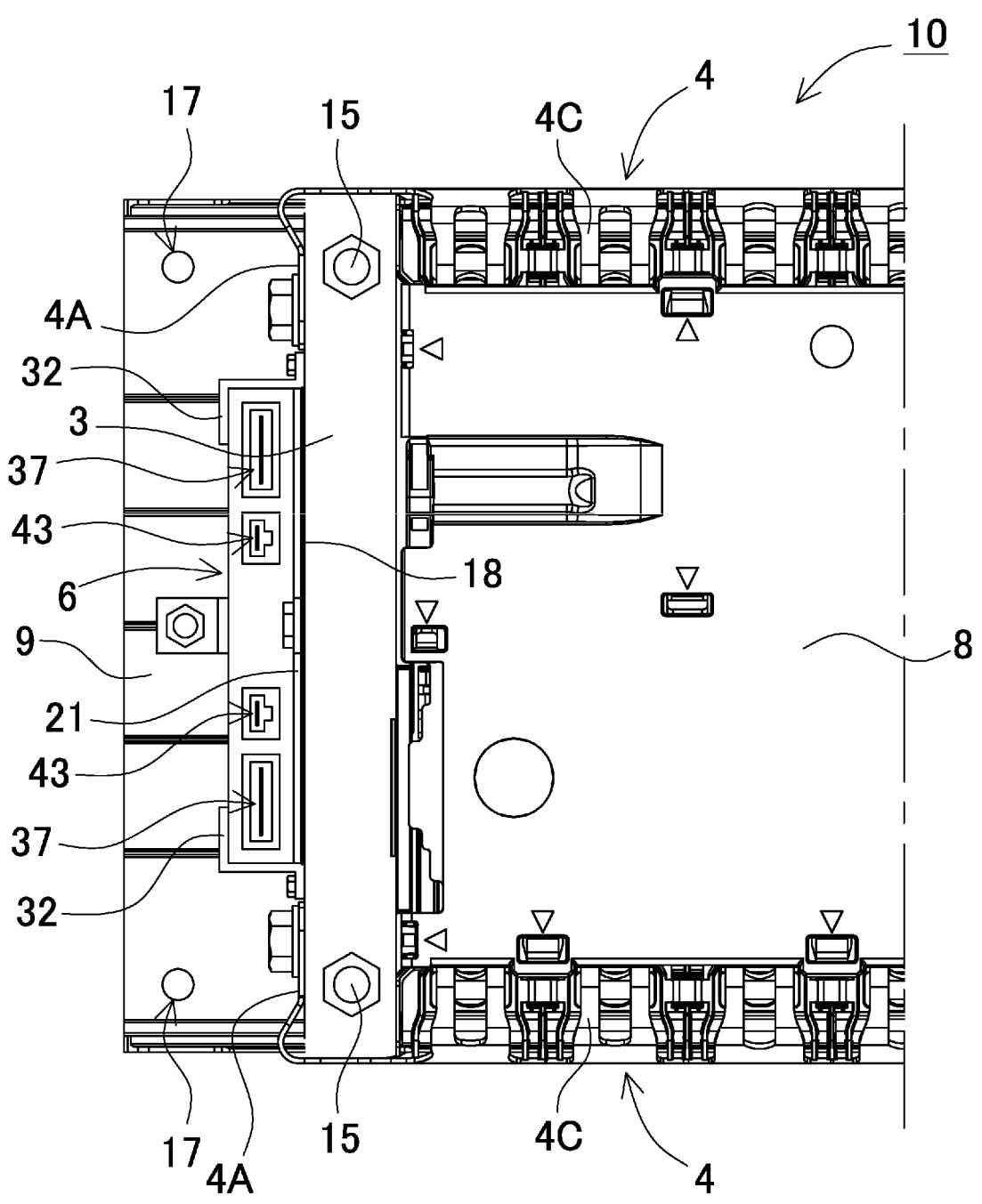
FIG. 9 is an enlarged plane showing another example of a coupling structure between an end plate and an electronic circuit block.

Electronic circuit block 6 including wireless communication circuit 31 is required to have a characteristic of eliminating a transmission error due to external noise. Metal end plate 3 can reduce an influence of external noise by shielding the surface of electronic circuit block 6. In particular, as shown in FIG. 9, in end plate 3 having shield protrusion part 32 that shields the outer peripheral edge of electronic circuit block 6 as an integrated structure, wireless communication circuit 31 can stably and accurately transmit information wirelessly. Furthermore, by connecting the end plate to the ground line, the shielding effect can be improved and the influence of external noise can be further reduced.

Electronic circuit block 6 further includes a communication circuit (not illustrated) for cascade-connecting a plurality of electronic circuit blocks 6 to transmit a signal. The communication circuit is connected to communication terminal 43 via coupling element 46. The communication circuit transmits a signal alternately transmitted between mutually connected detection circuit blocks 6 to coupling element 46. Communication terminal 43 is used as a terminal for connecting electronic circuit blocks 6 disposed on both sides of battery module 10, or is used as a terminal for connecting electronic circuit blocks 6 of a plurality of battery modules 10. Electronic circuit blocks 6 disposed on both sides of one battery module 10 are connected to each other via internal communication line 45. Furthermore, electronic circuit blocks 6 of different battery modules 10 are connected to each other via external communication line 44. Electronic circuit block 6 shown in the figures includes a plurality of communication terminals 43, and has a common terminal structure in which these communication terminals 43 can be connected to both internal communication line 45 and external communication line 44.

As shown in FIGS. 2, 4, and 7, electronic circuit block 6 can include a pair of left and right communication terminals 43. One of the pair of communication terminals 43 is connected to a high-order electronic circuit block in terms of potential, and the other is connected to a low-order electronic circuit block. However, in the case of a communication circuit of an isolation system such as a communication system using a coupling capacitor described above, it is not necessary to consider the potential. Therefore, each communication terminal 43 has a configuration capable of connecting and communicating with either the high-order electronic circuit block or the low-order electronic circuit block. Accordingly, since internal communication line 45 or external communication line 44 can be connected while selecting one of the left and right communication terminals 43 in a state where electronic circuit blocks are disposed on both sides of the battery module, electronic circuit block 6 with this structure has a feature that wiring of the communication line can be efficiently performed. That is, an ideal wiring can be achieved by selecting the connection positions of internal communication line 45 or external communication line 44 while using the same electronic circuit blocks 6 disposed on both sides of battery module 10. Electronic circuit block 6 shown in the figures is provided with a left and right pair of communication terminals 43 on the upper surface. As shown in the figures, the pair of communication terminals 43 formed on the upper surface of electronic circuit block 6 can be provided inside connection terminals 37 formed at both ends. Alternatively, although not illustrated, the communication terminals can also be provided outside the connection terminals. Further, although not illustrated, the electronic circuit block may be provided with a pair of communication terminals on left and right side surfaces instead of the upper surface or in addition to the upper surface.

(Power Supply Device 100)

Figure 10:
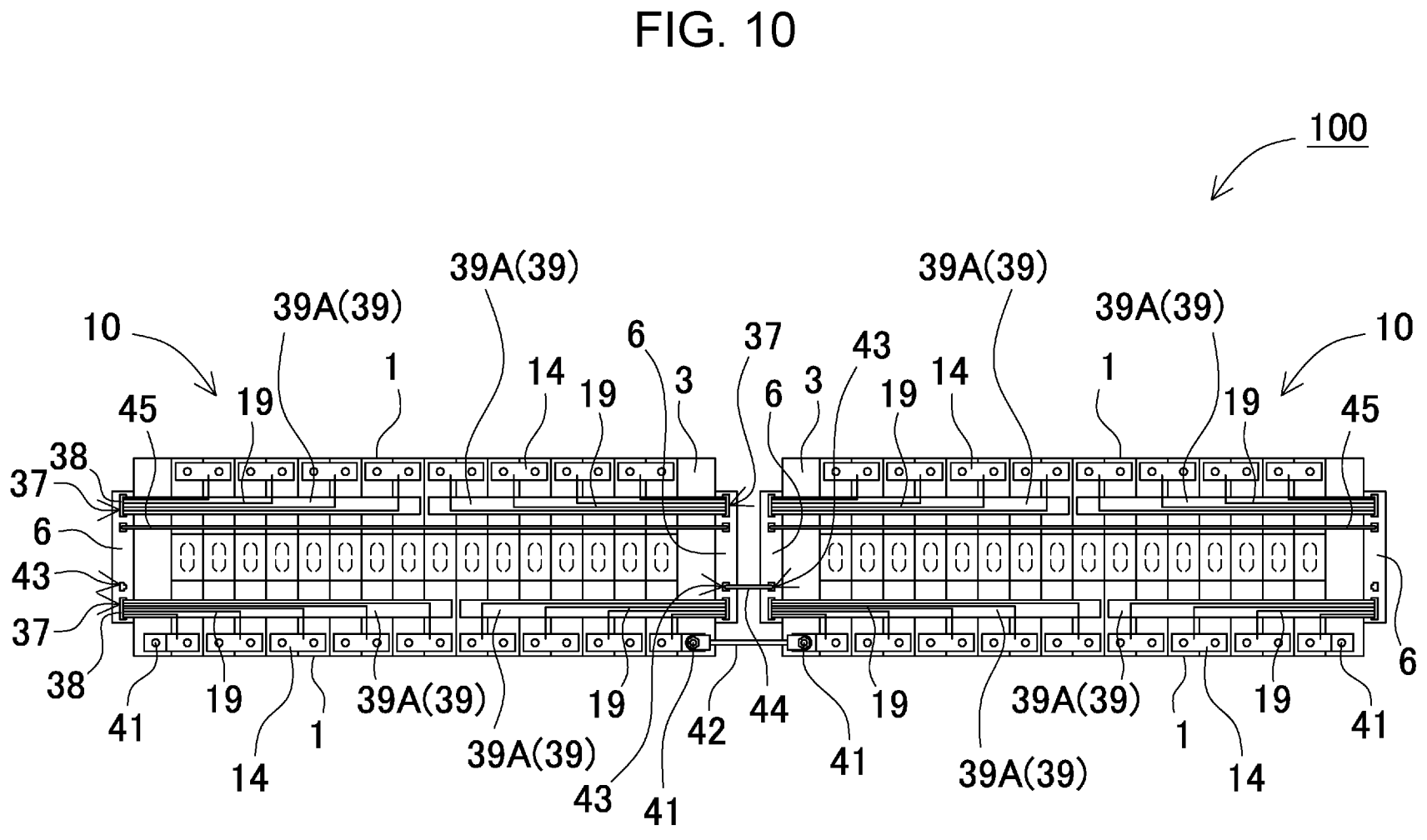
Figure 11:
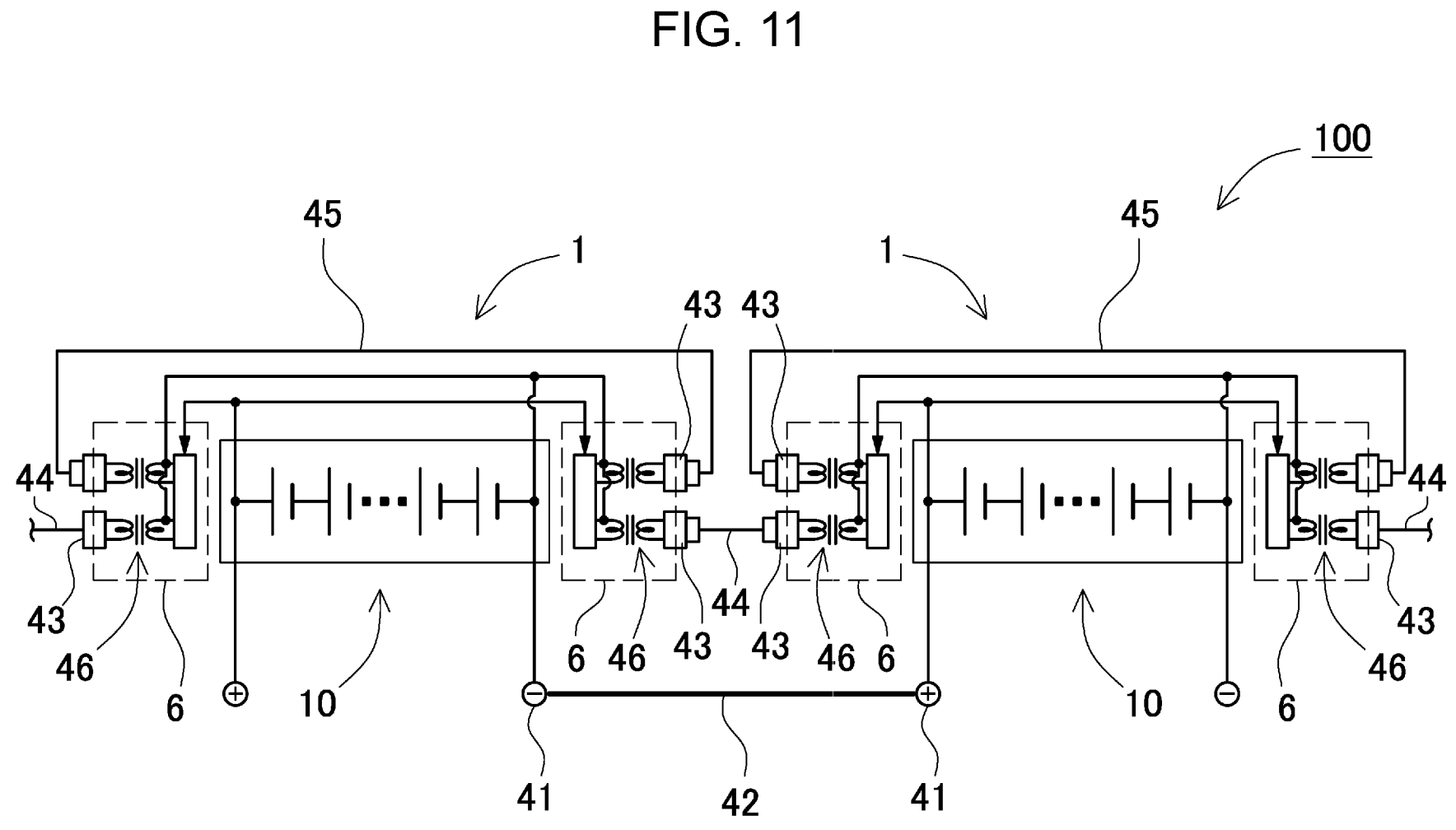

As shown in FIGS. 10 and 11, power supply device 100 having a large capacity can be achieved by connecting a plurality of battery modules 10 in series or in parallel by power line 42. The large-capacity power supply device 100 can be effectively used as a power supply of an electric vehicle such as a hybrid car or an electric car, and further as a power storage device. In this power supply device 100, adjacent battery modules 10 are connected by power line 42 and external communication line 44. Power line 42 is connected to output terminals 41 of battery modules 10 to connect battery modules 10 in series or in parallel. External communication line 44 is connected to communication terminals 43 provided in electronic circuit blocks 6, which are communication terminals 43 located at the ends of battery modules 10 connected by power line 42. In this power supply device 100, both power line 42 and external communication line 44 are connected to the end portions on the same side of battery modules 10, and external communication line 44 is connected to adjacent battery modules 10 at the shortest distance. Here, the ends on the same side of battery modules 10 mean ends on sides near each other.

Power supply device 100 includes a plurality of battery modules 10, and each battery module 10 includes two electronic circuit blocks 6. In this power supply device 100, all electronic circuit blocks 6 are cascade-connected. In this power supply device 100, all electronic circuit blocks 6 are cascade-connected, that is, connected in series, so that a signal from all battery modules 10 is transmitted to the outside through one line. Although a signal can be separately transmitted from each electronic circuit block 6 to the outside, this circuit configuration requires the same number of lines as the number of electronic circuit blocks, so that a signal transmission path to an external controlling circuit or the like disposed on the outside becomes complicated.

In power supply device 100 in which a plurality of battery modules 10 are connected in series, a potential difference is generated in a ground line of each battery module 10. Therefore, cascade connection is impossible. Since communication terminal 43 of each electronic circuit block 6 transmits a signal with the ground line as a reference potential, a plurality of communication terminals 43 having a potential difference with the ground line cannot be connected in series. This adverse effect can be eliminated by applying a bias voltage to the ground line of electronic circuit block 6 having a potential difference to shift the DC level of the ground line, and setting the potential difference of the ground line of the connected communication terminal 43 to a 0 level. However, in this circuit configuration, a circuit for applying the bias voltage becomes complicated, and it is also necessary to prevent a temperature shift of the bias voltage, making the circuit configuration even more complicated.

In order to prevent the above adverse effects and to cascade-connect communication terminals 43 of all electronic circuit blocks 6, electronic circuit block 6 includes a communication terminal 43 that cascade-connects the plurality of electronic circuit blocks 6 and transmits a signal. As shown in FIG. 11, communication terminal 43 is internally connected via coupling element 46 that interrupts direct current and allows an alternating current signal to pass. Any one of a coupling capacitor, a signal transmission transformer, and a photoelectric transmission element can be used as coupling element 46. Since coupling element 46 cuts off a DC component and transmits only the AC signal to communication terminal 43, this electronic circuit block 6 has an advantage that communication terminals 43 of a plurality of electronic circuit blocks 6 can be cascade-connected to transmit a signal without adjusting the DC level of the ground line of communication terminal 43. This is particularly effective in a device in which a plurality of battery modules 10 are connected in series.

Battery module 10 includes two electronic circuit blocks 6, and electronic circuit blocks 6 are disposed on respective end plates 3 provided at both ends of battery stack 2. The two electronic circuit blocks 6 provided in battery module 10 are connected by internal communication line 45, and battery modules 10 disposed adjacent to each other are connected by external communication line 44, and all electronic circuit blocks 6 are cascade-connected to transmit a signal to the outside through one line. Electronic circuit block 6 includes two communication terminals 43, one communication terminal 43 is connected to internal communication line 45, electronic circuit blocks 6 on both sides of battery stack 2 are connected via internal communication line 45, the other communication terminal 43 is connected to external communication line 44, the electronic circuit blocks of adjacent battery modules 10 are connected by external communication line 44, and all the electronic circuit blocks are cascade-connected. In addition, in battery module 10 of FIG. 7, the pair of communication terminals 43 provided in each electronic circuit block 6 are similar communication terminals 43 which can be connected to both internal communication line 45 and external communication line 44. In this battery module 10, as shown in FIG. 10, two battery modules 10 disposed closest to each other are connected by power line 42, and communication terminals 43 provided in the two battery modules 10 connected by power line 42 and disposed closest to each other can be connected by external communication line 44.

Battery module 10 described above can be used as a power source for a vehicle that supplies electric power to a motor that causes an electric vehicle to travel. As an electric vehicle mounted with battery module 10, an electric vehicle such as a hybrid automobile or a plug-in hybrid automobile that travels by both an engine and a motor, or an electric automobile that travels only by a motor can be used, and battery module 10 is used as a power source of these vehicles. In order to provide electric power that drives the vehicle, it is preferable to mount large-capacity, high-output power supply device 100 in which a plurality of above-described battery modules 10 are connected in series or parallel and a necessary controlling circuit is added.

(Power Supply Device for Hybrid Automobiles)

Figure 12:
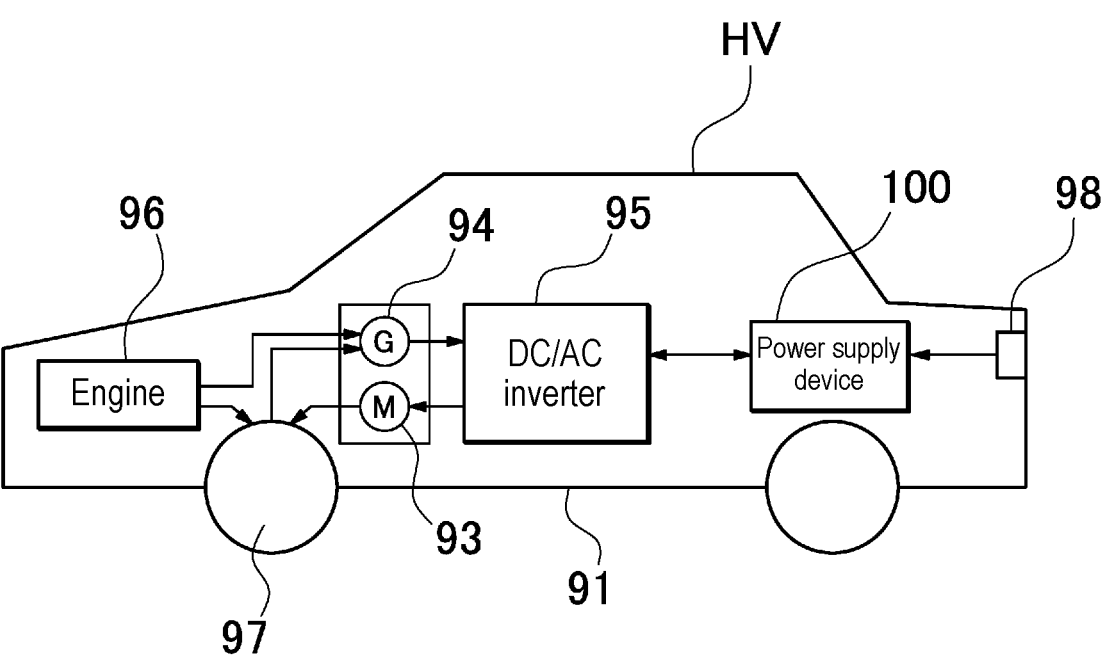
FIG. 12 is a block diagram showing an example in which a battery module is mounted on a hybrid vehicle that travels by an engine and a motor.

FIG. 12 shows an example in which power supply device 100 is mounted on a hybrid automobile that travels by both an engine and a motor. Vehicle HV on which power supply device 100 shown in this figure is mounted includes vehicle body 91, engine 96 and motor for travelling 93 that cause this vehicle body 91 to travel, wheels 97 driven by this engine 96 and motor for travelling 93, power supply device 100 that supplies electric power to motor 93, and power generator 94 that charges the battery of power supply device 100. Power supply device 100 is connected to motor 93 and power generator 94 via DC/AC inverter 95. Vehicle HV travels using both motor 93 and engine 96 while charging and discharging the battery of power supply device 100. Motor 93 is driven in a region where engine efficiency is low, for example, during acceleration or low-speed travelling, and causes the vehicle to travel. Motor 93 is driven by electric power supplied from power supply device 100. Power generator 94 is driven by engine 96 or driven by regenerative braking acquired when braking is applied to the vehicle, and charges the battery of power supply device 100. As shown in the figure, vehicle HV may include charging plug 98 to charge power supply device 100. Connecting this charging plug 98 to an external power source enables charging of power supply device 100.

(Power Supply Device for Electric Automobile)

Figure 13:
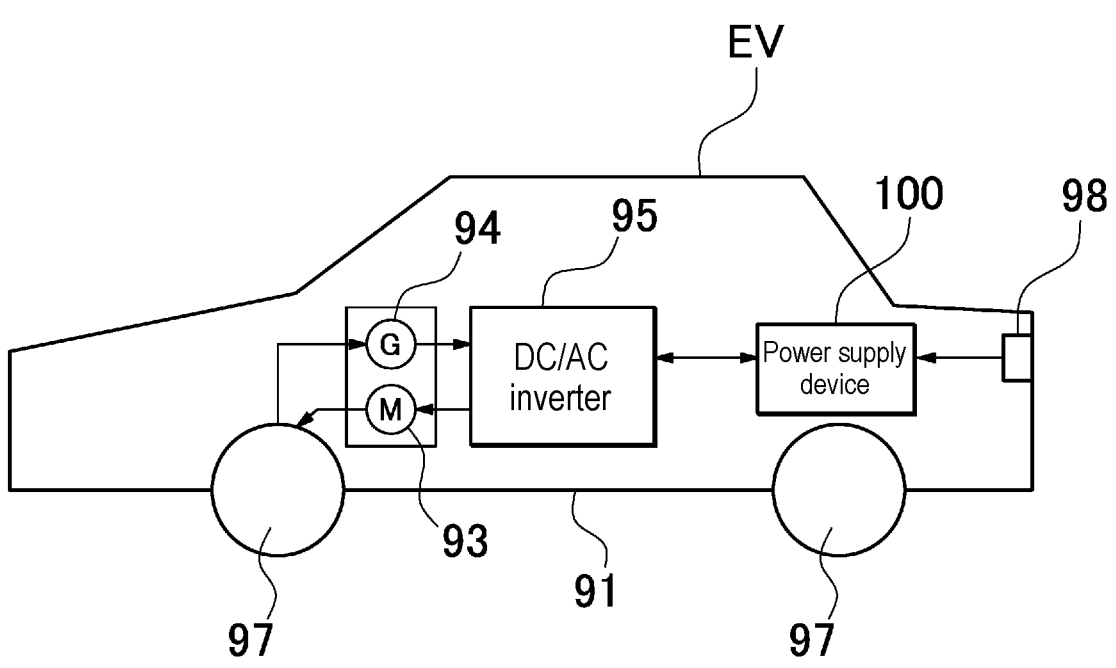
FIG. 13 is a block diagram showing an example in which a battery module is mounted on an electric automobile traveling only by a motor.

FIG. 13 shows an example in which a power supply device is mounted on an electric automobile that travels only by a motor. Vehicle EV on which power supply device 100 shown in this figure is mounted includes vehicle body 91, motor for travelling 93 that causes this vehicle body 91 to travel, wheels 97 that are driven by this motor 93, power supply device 100 that supplies electric power to this motor 93, and power generator 94 that charges the battery of this power supply device 100. Power supply device 100 is connected to motor 93 and power generator 94 via DC/AC inverter 95. Motor 93 is driven by electric power supplied from power supply device 100. Power generator 94 is driven by the energy at the time of applying regenerative braking to vehicle EV and charges the battery of power supply device 100. Vehicle EV includes charging plug 98, and power supply device 100 can be charged by this connecting charging plug 98 to an external power source.

(Power Supply Device for Power Storage Device)

Figure 14:
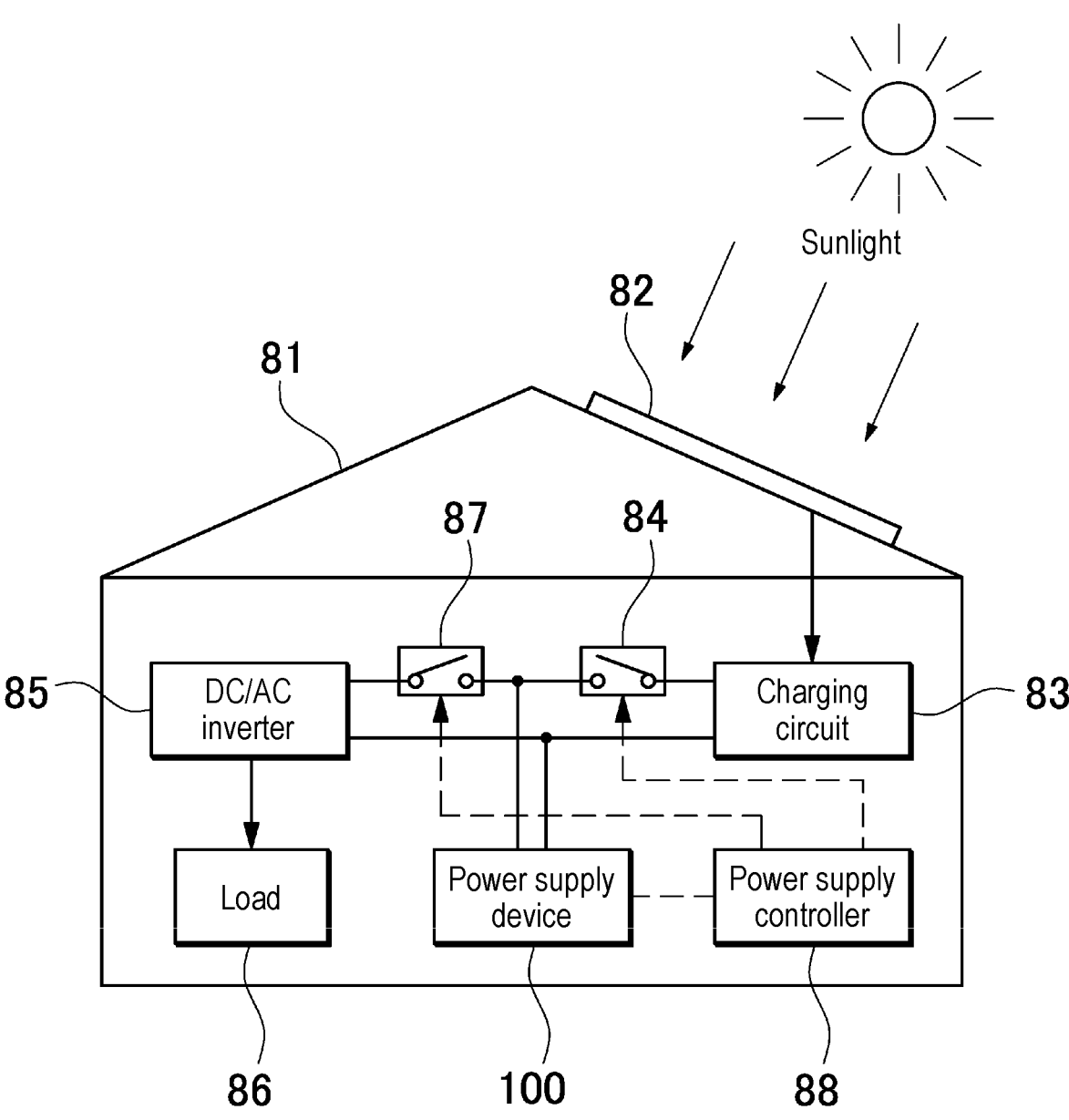
FIG. 14 is a block diagram showing an example in which a battery module is used in a power storage device.
Figure 15:
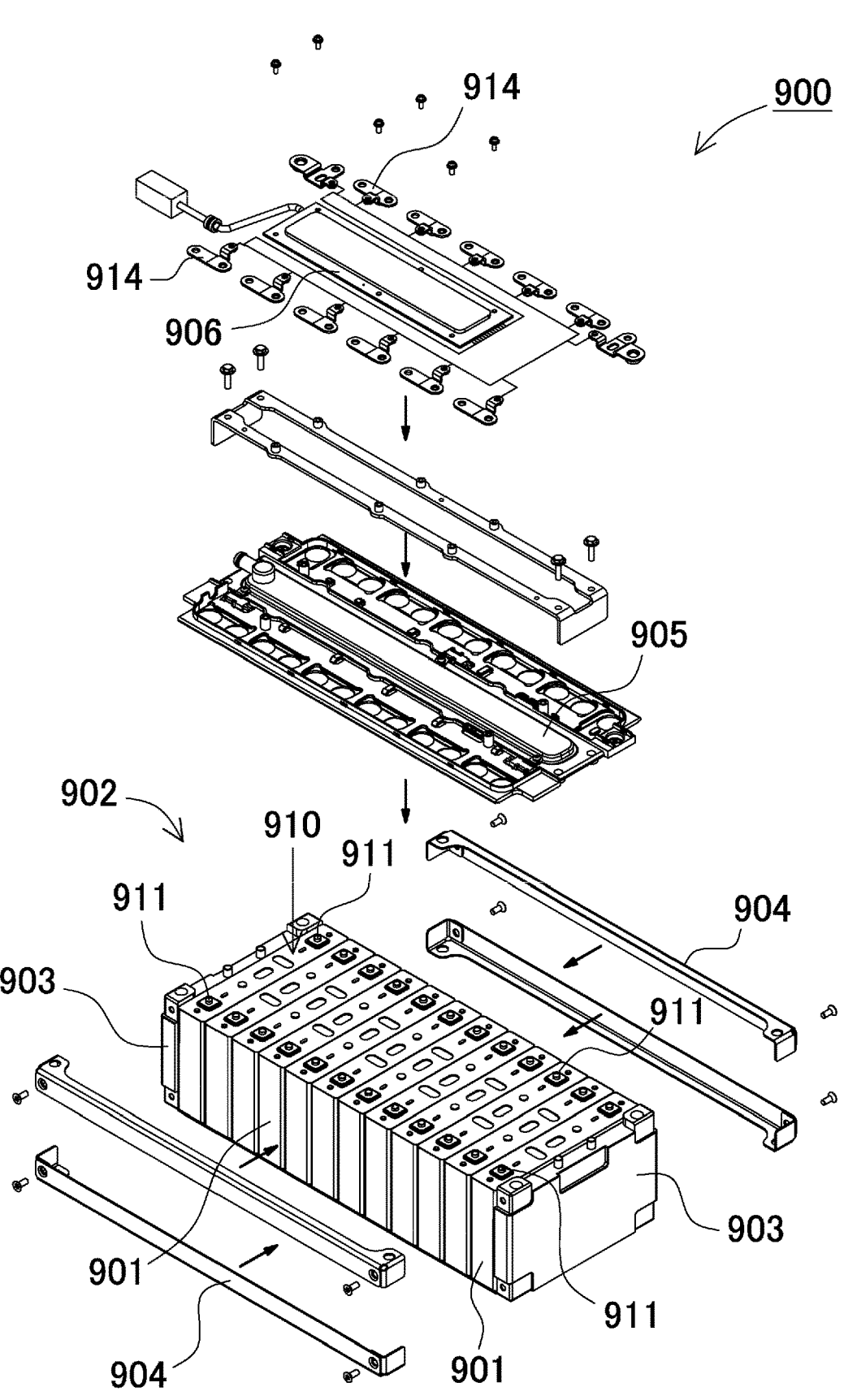
FIG. 15 is an exploded perspective view of a conventional battery module.

The application of the power supply device of the present invention is not limited to a power source for a motor that causes a vehicle to travel. The power supply device according to the exemplary embodiments can be used as a power source for a power storage device that performs power storage by charging the battery with electric power generated by photovoltaic power generation, wind power generation, or other methods. FIG. 14 shows a power storage device that performs power storage by charging the battery of power supply device 100 by solar battery 82.

The power storage device shown in 14 charges the battery of power supply device 100 with electric power generated by solar battery 82 disposed on a roof or a rooftop of building 81 such as a house or a factory. This power storage device charges the battery of power supply device 100 via charging circuit 83 with solar battery 82 serving as a charging power source, and then supplies electric power to load 86 via DC/AC inverter 85. Thus, this power storage device includes a charge mode and a discharge mode. In the power storage device shown in the figure, DC/AC inverter 85 is connected to power supply device 100 via discharging switch 87 and charging circuit 83 is connected to power supply device 100 via charging switch 84. Discharging switch 87 and charging switch 84 are turned on and off by power supply controller 88 of the power storage device. In the charge mode, power supply controller 88 turns on charging switch 84 and turns off discharging switch 87 to allow charging from charging circuit 83 to power supply device 100. When charging is completed and the battery is fully charged or when the battery is in a state where a capacity of a predetermined value or more is charged, power supply controller 88 turns off charging switch 84 and turns on discharging switch 87 to switch the mode to the discharge mode and allows discharging from power supply device 100 to load 86. When necessary, power supply controller 88 can supply electric power to load 86 and charge power supply device 100 simultaneously by turning on charging switch 84 and turning on discharging switch 87.

Although not illustrated, the power supply device can also be used as a power source of a power storage device that performs power storage by charging a battery using midnight electric power at night. The power supply device that is charged with midnight electric power is charged with the midnight electric power that is surplus electric power generated by a power station, and outputs the electric power during the daytime when an electric power load increases, which can limit peak electric power during the daytime to a small value. The power supply device can also be used as a power source charged with both output of a solar battery and the midnight electric power. This power supply device can efficiently perform power storage using both electric power generated by the solar battery and the midnight electric power effectively in consideration of weather and electric power consumption.

The power storage device described above can be suitably used for the following applications: a backup power supply device mountable in a rack of a computer server; a backup power supply device used for wireless base stations of cellular phones and the like; a power supply for power storage used at home or in a factory; an electrical storage device combined with a solar battery, such as a power supply for street lights; and a backup power supply for traffic lights or traffic displays for roads.

INDUSTRIAL APPLICABILITY

The battery module and the power supply device according to the present invention can be suitably used as a power source for a plug-in hybrid electric automobile and a hybrid electric automobile that can switch between an EV traveling mode and an HEV traveling mode, an electric automobile, and the like. In addition, this battery module and power supply device can also be used as appropriate for backup power sources that can be mounted in computer server racks, backup power sources for wireless base stations of cellular phones and the like, power storage power sources for homes and in factories, power sources for street lights, power storage devices combined with solar batteries, backup power sources for traffic lights, and the like.

REFERENCE MARKS THE DRAWINGS

100: power supply device
1: battery cell
1*a*: exhaust valve
1X: terminal surface
2: battery stack
2A: battery unit
2X: electrode surface
3: end plate
4: bind bar
4A: fixing part
4B: lower coupling piece
4C: pressing piece
5: gas duct
5*a*: opening part
6: electronic circuit block
8: cover case
9: base plate
10: battery module
11: electrode terminal

12: insulating spacer
13: end surface spacer
14: bus bar
15: fixing screw
16: fixing screw
17: fixing hole
18: insulating sheet
19: voltage detection line
20: circuit board
21: radiator
22: voltage detection circuit
23: cell balance adjustment circuit
24: discharge circuit
25: discharge resistor
26: switching element
27: control circuit
28: power source circuit
30: controlling circuit
31: wireless communication circuit
32: shield protrusion part
33: central controlling circuit
37: connection terminal
38: connector
39: printed circuit
39A: flexible printed circuit
41: output terminal
42: power line
43: communication terminal
44: external communication line
45: internal communication line
46: coupling element
70: battery module
81: building
82: solar battery
83: charging circuit
84: charging switch
85: DC/AC inverter
86: load
87: discharging switch
88: power supply controller
91: vehicle body
93: motor
94: power generator
95: DC/AC inverter
96: engine
97: wheel
98: charging plug
900: battery module
901: battery cell
902: battery stack
903: end plate
904: bind bar
905: gas duct
906: circuit board
910: terminal surface
911: electrode terminal
914: bus bar
HV, EV: vehicle

The invention claimed is:
1. A battery module comprising:
a battery stack including a plurality of stacked battery cells;
a pair of end plates disposed at both ends of the battery stack in a stacking direction of the battery stack;
a bind bar coupling the pair of end plates together; and a pair of electronic circuit blocks mounted with a voltage detection circuit that detects a voltage of each of the plurality of stacked battery cells, wherein the pair of electronic circuit blocks are disposed on outer surfaces of the pair of end plates disposed at the ends of the battery stack, and the pair of the electronic circuit blocks are connected to the plurality of stacked battery cells via voltage detection lines.

2. The battery module according to claim 1, wherein the battery stack including the plurality of stacked battery cells is partitioned into a plurality of battery units in a middle in the stacking direction of the plurality of stacked battery cells, and each of the plurality of battery units is connected to the corresponding one of the electronic circuit blocks via the voltage detection lines.

3. The battery module according to claim 1, wherein the battery stack includes a gas duct connected to an opening part of an exhaust valve provided in each of the plurality of stacked battery cells, the gas duct is disposed at a center of an electrode surface of the battery stack, the gas duct extending in the stacking direction of the plurality of stacked battery cells, and the voltage detection lines are disposed along a side edge of the gas duct.

4. The battery module according to claim 3, wherein the voltage detection lines are disposed on both sides of the gas duct.

5. The battery module according to claim 1, wherein the each of the pair of electronic circuit blocks includes a cell balance adjustment circuit which adjusts a cell balance among each of the plurality of stacked battery cells, and the cell balance adjustment circuit adjusts the cell balance among each of the plurality of stacked battery cells by energizing the voltage detection lines.

6. The battery module according to claim 1, wherein the voltage detection lines are made of a wire harness or a printed circuit.

7. The battery module according to claim 6, wherein the printed circuit of the voltage detection lines are a flexible printed circuit.

8. A plurality of battery modules each being the battery nodule according to claim 1, wherein an electronic circuit block of each of the plurality of battery modules includes a communication terminal configured to transmit a signal by cascading a plurality of electronic circuit blocks of the plurality of battery modules, and the communication terminal is internally connected via a coupling element that interrupts a direct current and allows an alternating current signal to pass therethrough.

9. The plurality of the battery modules according to claim 8, wherein the coupling element is any one of a coupling capacitor, a transformer, or a photoelectric transmission element.

10. A power supply device comprising:

a plurality of battery modules each being the battery module according to claim 8;

a power line; and an external communication line, wherein the power line and the external communication line connect adjacent battery modules of the plurality of battery modules, the power line is connected to output terminals of the adjacent battery modules, the external communication line is connected to the communication terminal, the external communication line is connected to communication terminals located at ends of adjacent battery modules where the power line is connected and the communication terminals including the communication terminal, and both the power line and the external communication line are connected to ends on a same side of the adjacent battery modules.

11. The power supply device according to claim 10, wherein on the plurality of battery modules disposed adjacent to each other, the external communication line is connected to a pair of the communication terminals disposed closest to each other.

12. An electric vehicle comprising:

the power supply device according to claim 10;

a motor for travelling that receives electric power from the power supply device;

a vehicle body that is equipped with the power supply device and the motor; and a wheel that is driven by the motor to cause the vehicle body to travel.

13. A power storage device comprising:

the power supply device according to claim 10; and a power supply controller configured to control charging and discharging of the power supply device, wherein the power supply controller enables charging of the plurality of stacked battery cells with electric power from outside and controls the charging of the plurality of stacked battery cells.

* * * * *